(12) United States Patent
Cumings et al.

(10) Patent No.: US 7,960,852 B2
(45) Date of Patent: Jun. 14, 2011

(54) FLUID TURBINE DEVICES AND METHODS RELATED TO FLUID TURBINE DEVICES

(75) Inventors: Robert C. Cumings, St. Peters, MO (US); Derrick J. Weisbrod, Lonedell, MO (US)

(73) Assignee: Freiezo, LLC, St. Peters, MO (US)

( * ) Notice: Subject to any disclaimer, the term of this patent is extended or adjusted under 35 U.S.C. 154(b) by 0 days.

(21) Appl. No.: 12/856,693

(22) Filed: Aug. 16, 2010

(65) Prior Publication Data

US 2011/0070066 A1 Mar. 24, 2011

Related U.S. Application Data

(63) Continuation-in-part of application No. 12/568,091, filed on Sep. 28, 2009.

(51) Int. Cl.
*F03D 9/00* (2006.01)
(52) U.S. Cl. .......................... 290/55; 415/2.1
(58) Field of Classification Search .................. 290/55; 415/1, 4.1
See application file for complete search history.

(56) References Cited

U.S. PATENT DOCUMENTS

| | | | | |
|---|---|---|---|---|
| 1,615,675 A | * | 1/1927 | Bender | 415/4.4 |
| 4,031,405 A | * | 6/1977 | Asperger | 290/55 |
| 4,075,500 A | * | 2/1978 | Oman et al. | 290/55 |
| 4,119,863 A | * | 10/1978 | Kelly | 290/55 |
| 4,237,384 A | | 12/1980 | Kennon | |
| 4,288,200 A | * | 9/1981 | O'Hare | 415/4.4 |
| 4,295,783 A | * | 10/1981 | Lebost | 415/4.4 |
| 4,309,146 A | | 1/1982 | Hein et al. | |
| 4,474,529 A | * | 10/1984 | Kinsey | 415/4.2 |
| 4,551,631 A | | 11/1985 | Trigilio | |
| 4,652,206 A | | 3/1987 | Yeoman | |
| 5,083,899 A | * | 1/1992 | Koch | 415/2.1 |
| 5,447,412 A | | 9/1995 | Lamont | |
| 5,463,257 A | | 10/1995 | Yea | |
| 5,503,530 A | | 4/1996 | Walters | |

(Continued)

FOREIGN PATENT DOCUMENTS

DE 3631709 3/1988

OTHER PUBLICATIONS

Falcon Series; Vertical Axis Wind Turbines (VAWT); www.wepower. us; copyright 2009; 7 pgs.

(Continued)

*Primary Examiner* — Joseph Waks
(74) *Attorney, Agent, or Firm* — Harness, Dickey & Pierce, P.L.C.

(57) ABSTRACT

Fluid turbine devices and methods related to fluid turbine devices are disclosed herein. One example method includes deflecting a first portion of a fluid flow from a return path of a vertical blade assembly, while permitting a second portion of the fluid flow to enter a drive path of the vertical blade assembly. Another example method related to a fluid flow device includes orienting a shroud relative to a fluid flow to deflect a first portion of a fluid flow from a return path of a vertical blade assembly and to permit a second portion of the fluid flow to enter a drive path of the vertical blade assembly and activating a generator, based on an operating characteristic of the fluid turbine device, to regulate a rotational speed of the vertical blade assembly.

19 Claims, 33 Drawing Sheets

U.S. PATENT DOCUMENTS

| | | | |
|---|---|---|---|
| 5,852,331 A | 12/1998 | Giorgini | |
| 6,638,005 B2 * | 10/2003 | Holter et al. | 415/4.2 |
| 6,655,907 B2 * | 12/2003 | Brock et al. | 415/4.2 |
| 6,955,521 B2 * | 10/2005 | Yang | 415/4.2 |
| 6,966,747 B2 | 11/2005 | Taylor et al. | |
| 6,984,899 B1 | 1/2006 | Rice | |
| 7,109,599 B2 | 9/2006 | Watkins | |
| 7,215,037 B2 * | 5/2007 | Scalzi | 290/55 |
| 7,230,348 B2 * | 6/2007 | Poole | 290/55 |
| 7,235,893 B2 * | 6/2007 | Platt | 290/54 |
| 7,365,448 B2 | 4/2008 | Stephens | |
| 7,381,030 B1 | 6/2008 | Vanderhye | |
| 7,400,057 B2 | 7/2008 | Sureshan | |
| 7,540,705 B2 * | 6/2009 | Emshey | 415/4.1 |
| 7,726,933 B2 | 6/2010 | Johnson | |
| 7,880,322 B2 * | 2/2011 | Cumings et al. | 290/54 |
| 2007/0102938 A1 * | 5/2007 | Poole | 290/55 |
| 2008/0085179 A1 | 4/2008 | Kinkaid et al. | |
| 2009/0045632 A1 * | 2/2009 | Krauss | 290/54 |
| 2010/0213716 A1 | 8/2010 | Santoro | |
| 2010/0260593 A1 * | 10/2010 | Cumings et al. | 415/1 |
| 2011/0070068 A1 * | 3/2011 | Cumings et al. | 415/30 |

OTHER PUBLICATIONS

Office Action from U.S. Appl. No. 12/568,091, which is related to the instant application through a priority claim; dated Dec. 1, 2010, 10 pages.

Office Action from U.S. Appl. No. 12/856,693, which is related to the instant application through a priority claim; dated Dec. 8, 2010, 11 pages.

* cited by examiner

WIND DIRECTION

WIND DIRECTION

WIND DIRECTION

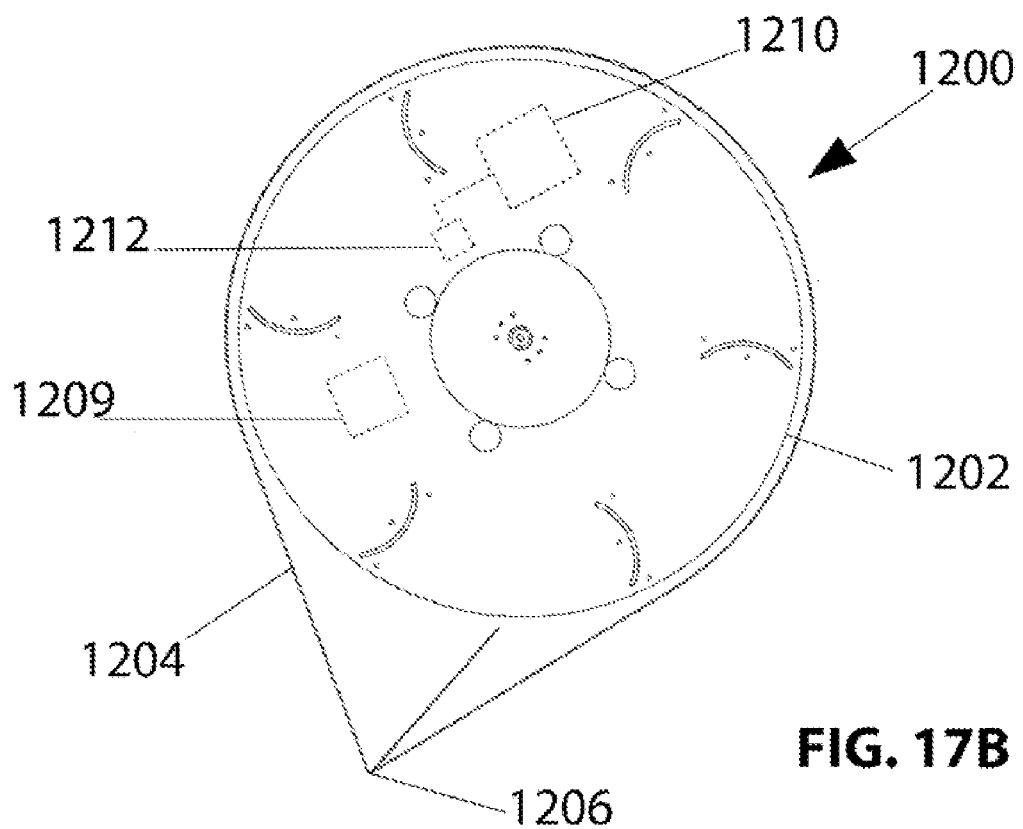
FIG. 17B
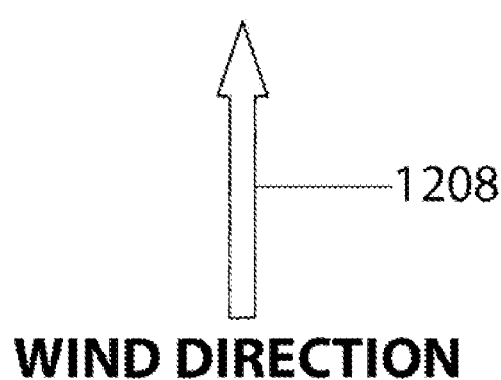
WIND DIRECTION

FLUID TURBINE DEVICES AND METHODS RELATED TO FLUID TURBINE DEVICES

CROSS-REFERENCE TO RELATED APPLICATION

This application is a continuation-in-part of U.S. patent application Ser. No. 12/568,091 filed Sep. 28, 2009. The entire disclosure of the above application is incorporated herein by reference.

FIELD

The present disclosure relates to fluid turbine devices and methods related to fluid turbine devices.

BACKGROUND

This section provides background information related to the present disclosure which is not necessarily prior art.

Fluid turbines are commonly used to convert fluid movement into useful work. Often, fluid turbines are employed such that fluid flow contacts multiple blades thereby causing rotation of the blades. The rotation of the multiple blades may be converted into any useful motion, such as rotating an input of a generator to generate electricity.

SUMMARY

This section provides a general summary of the disclosure, and is not a comprehensive disclosure of its full scope or all of its features.

According to one aspect of the present disclosure, a method related to the operation of a fluid turbine device having a vertical blade assembly is disclosed. The method includes deflecting a first portion of a fluid flow from a return path of the vertical blade assembly, while permitting a second portion of the fluid flow to enter a drive path of the vertical blade assembly.

According to another aspect of the present disclosure, a method related to a fluid turbine device is disclosed. The fluid turbine device includes a shroud and a vertical blade assembly defining a central axis and having multiple blades disposed about the central axis. The shroud is disposed at least partially about the vertical blade assembly. The vertical blade assembly is rotatable about the central axis in response to a fluid flow and mechanically coupled to a generator. The method includes orienting the shroud relative to the fluid flow to deflect a first portion of the fluid flow from a return path of the vertical blade assembly and to permit a second portion of the fluid flow to enter a drive path of the vertical blade assembly and activating the generator, based on an operating characteristic of the fluid turbine device, to regulate the rotational speed of the vertical blade assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
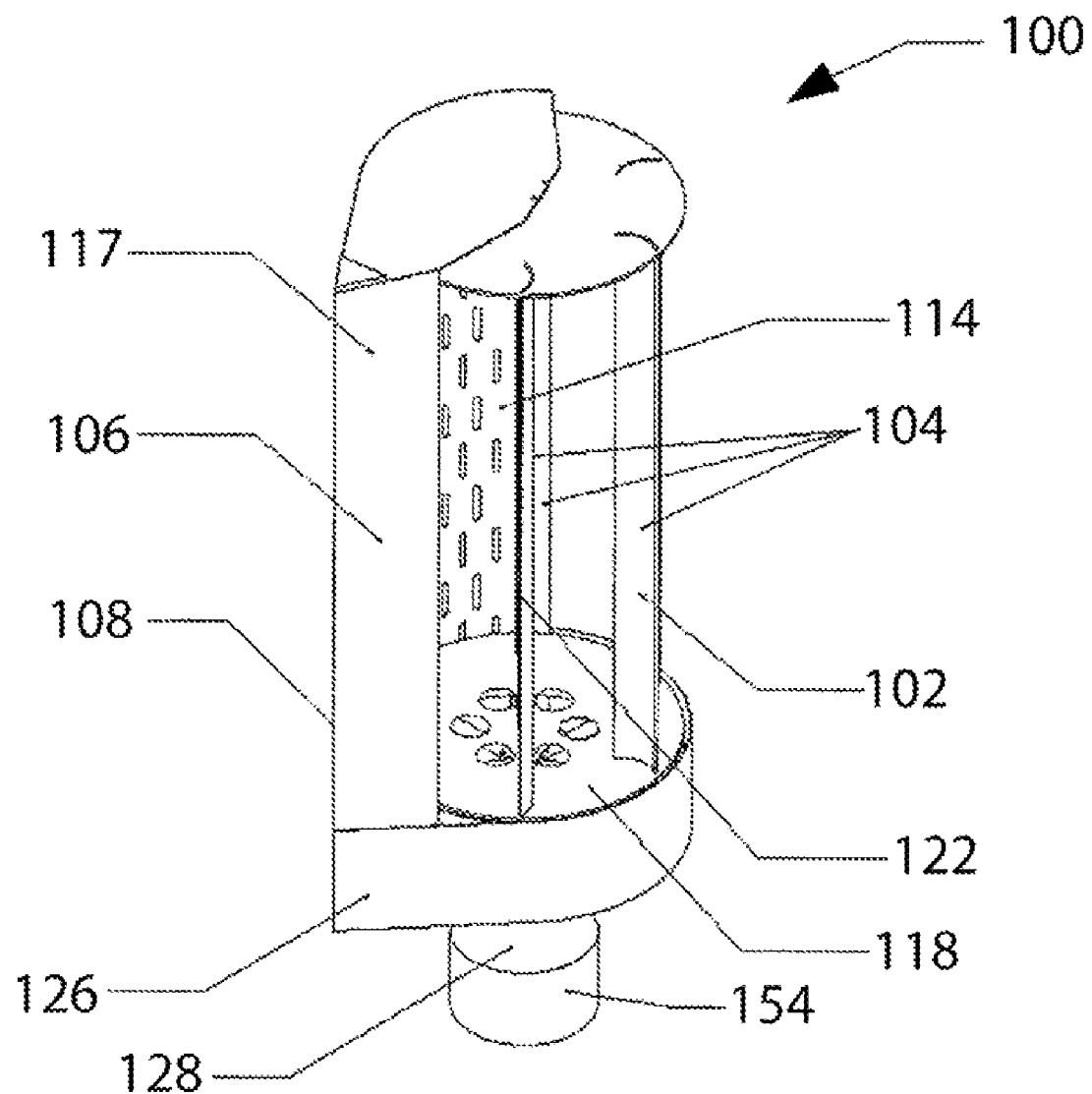
FIG. 1 is a perspective view of a fluid turbine device according to one example embodiment of the present disclosure.

FIGS. 4A-D are exploded views of the fluid turbine device of FIG. 1.

Figure 5:
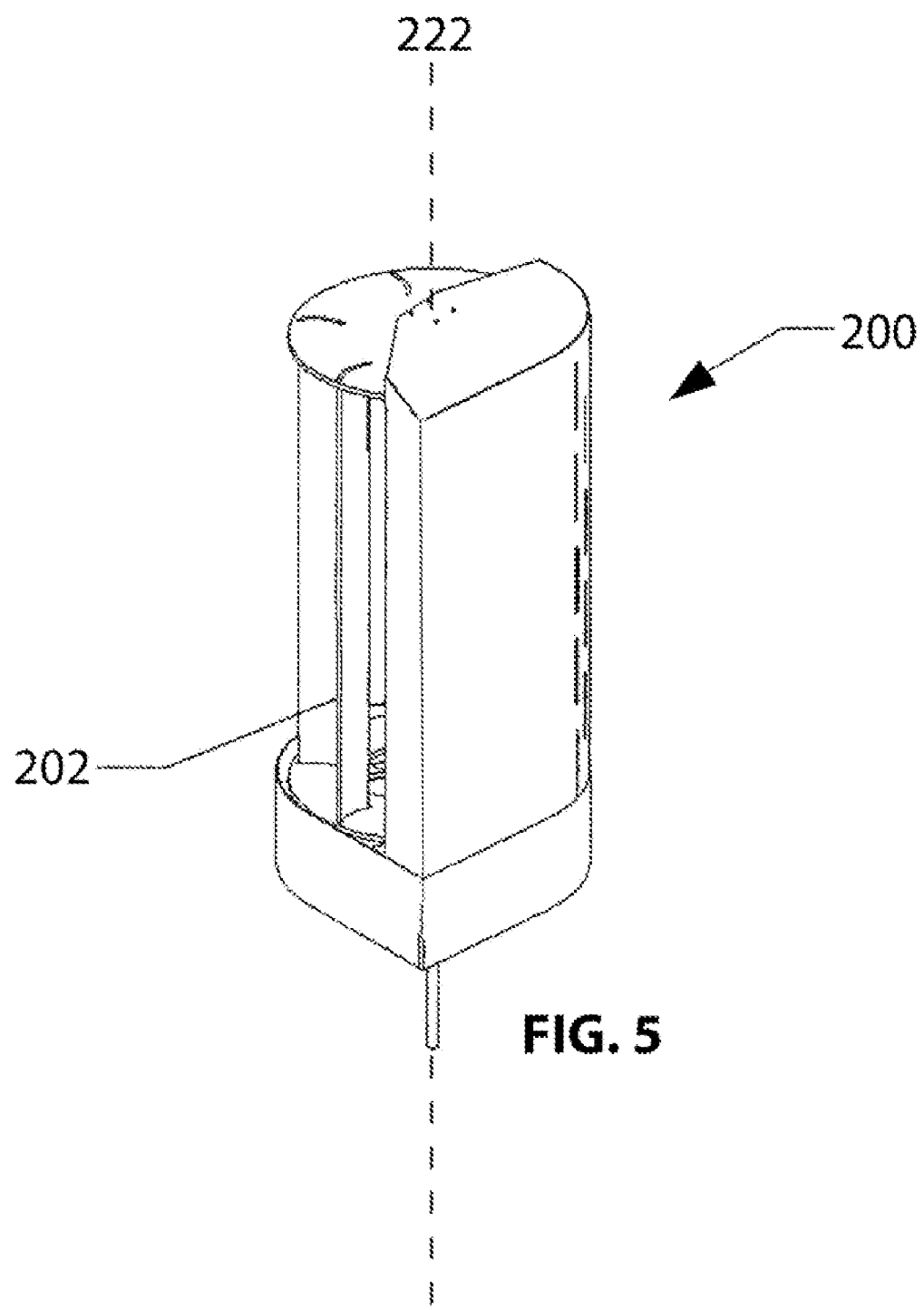

FIG. 5 is a perspective view of a fluid turbine device having a vertical blade assembly configured to rotate clockwise according to another example embodiment of the present disclosure.

Figure 6:
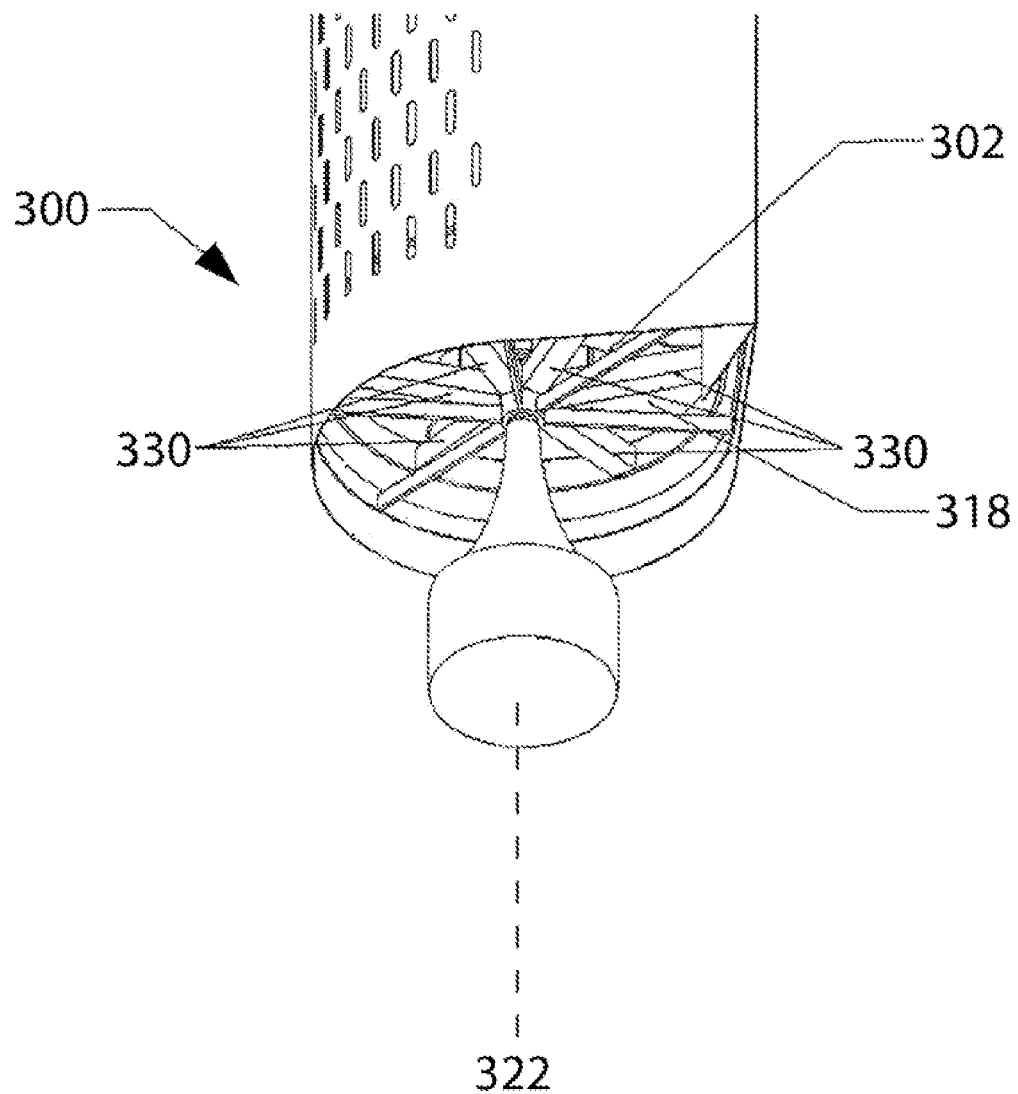

FIG. 6 is a sectional view of a fluid turbine device including a vertical blade assembly having multiple chambers according to yet another example embodiment of the present disclosure.

Figure 7:
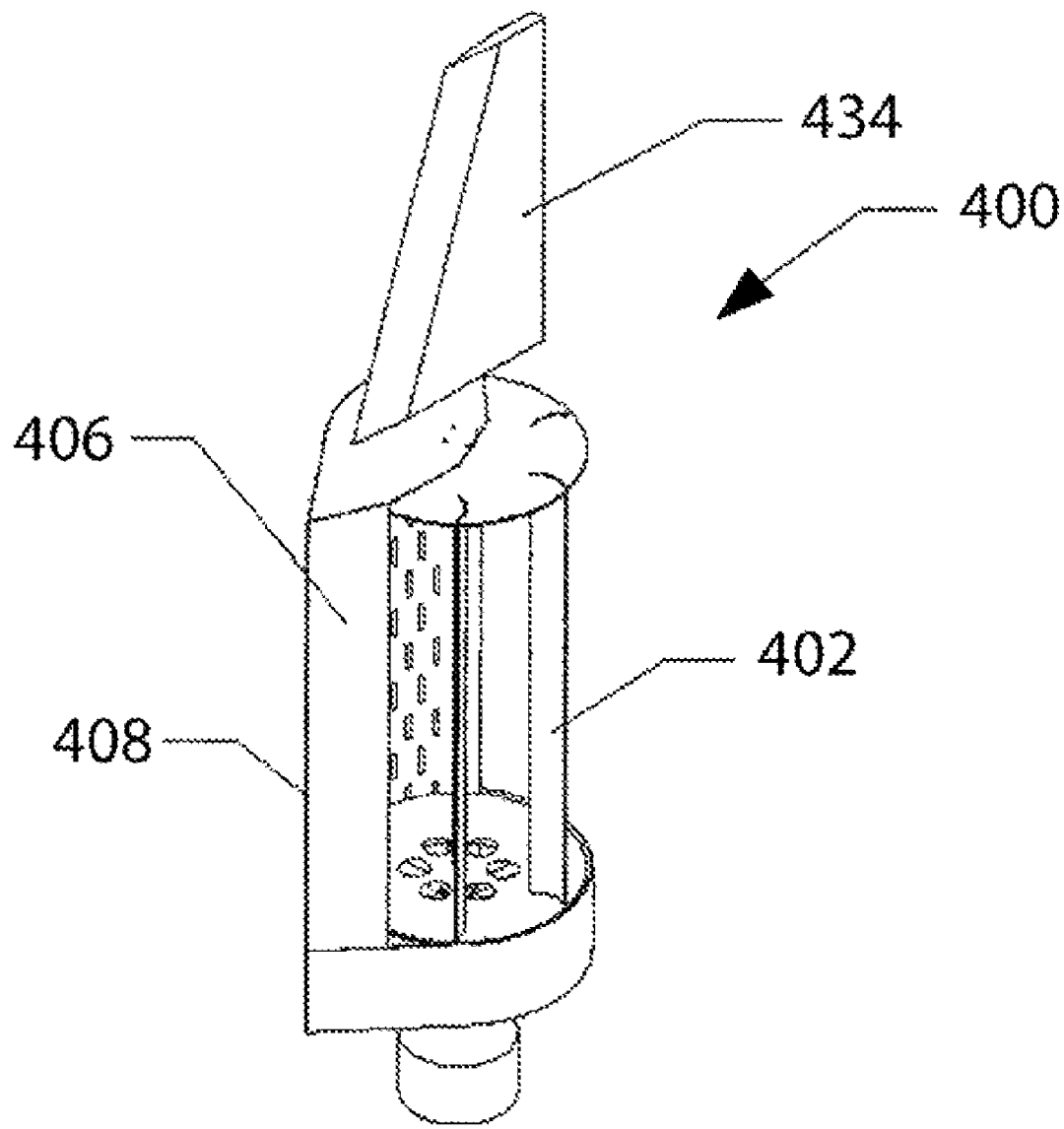

FIG. 7 is a perspective view of a fluid turbine device including a rudder according to another example embodiment of the present disclosure.

Figure 8A:
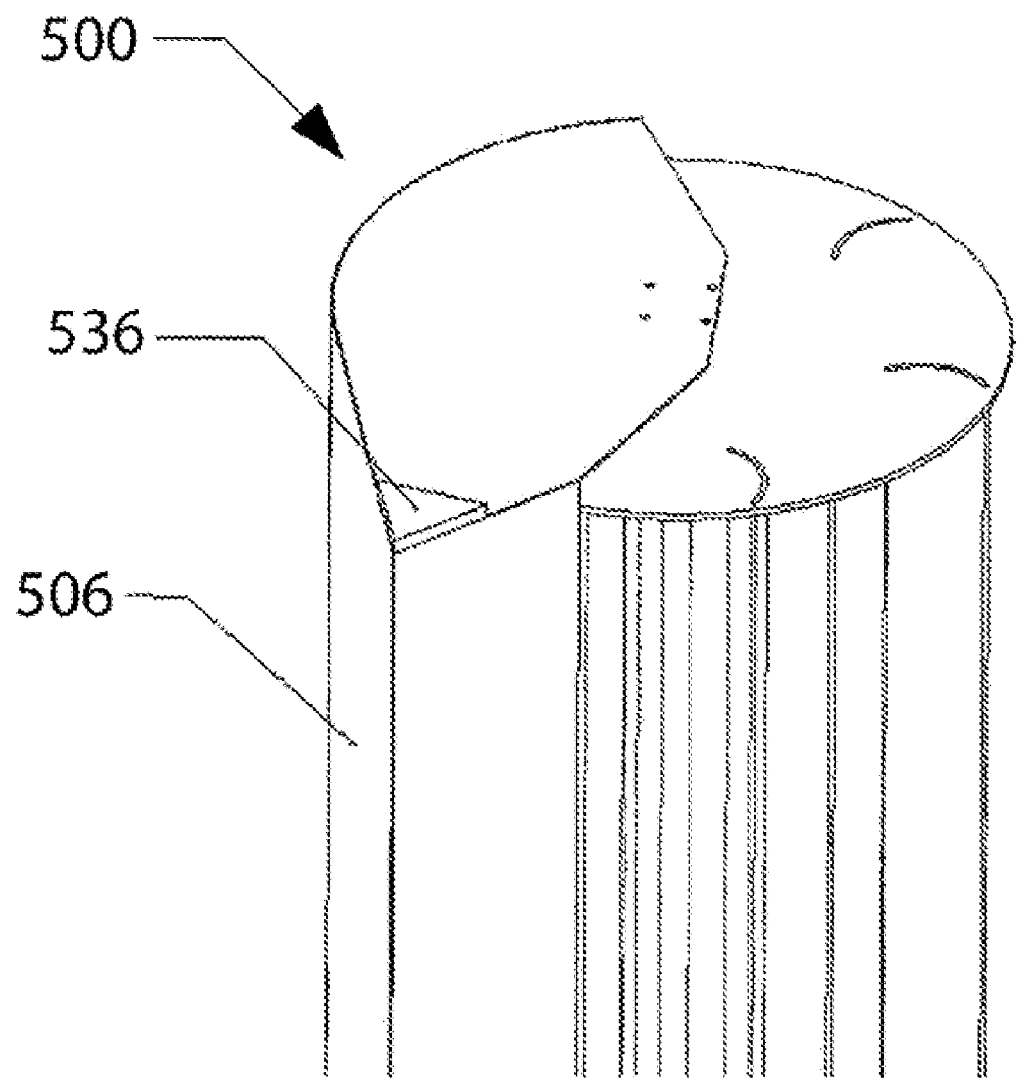
Figure 8B:
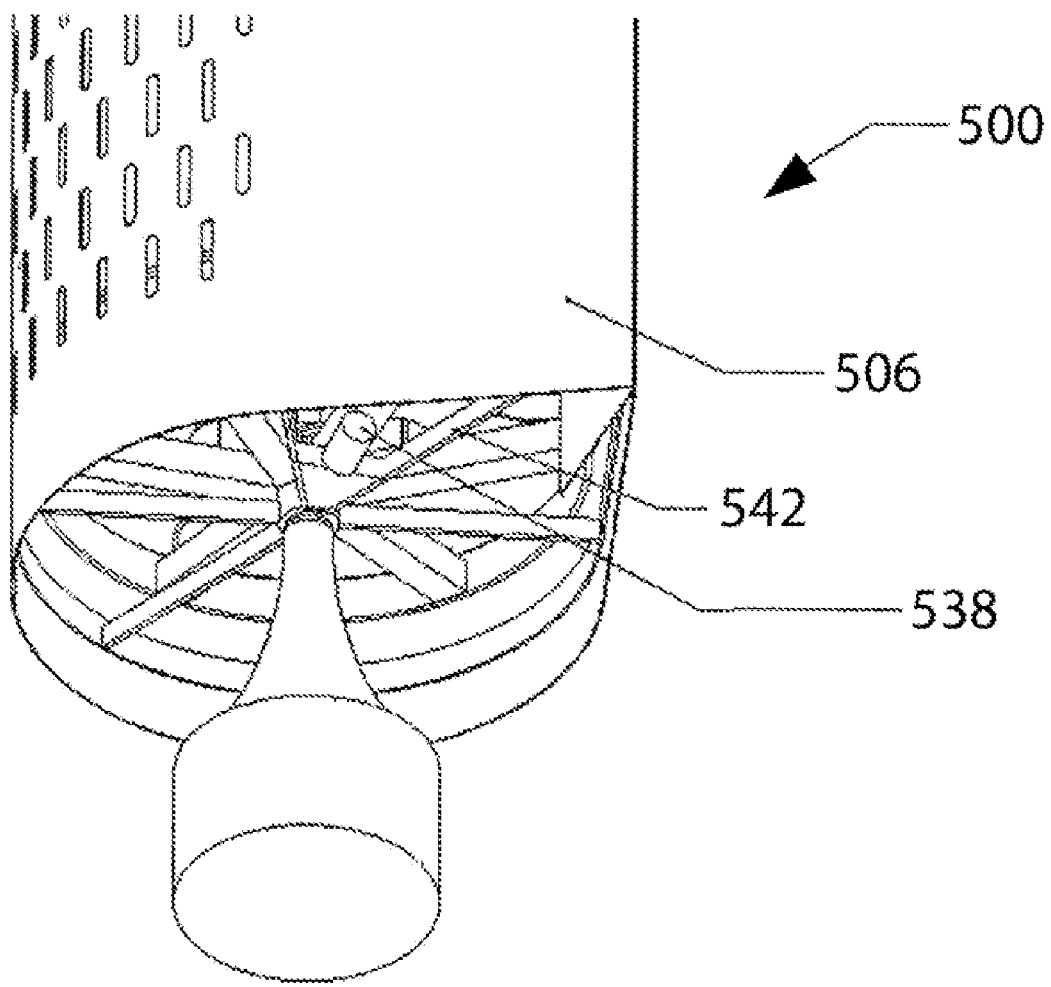

FIGS. 8A-B are partial perspective views of a fluid turbine device including a steering mechanism according to another example embodiment of the present disclosure.

Figure 9:
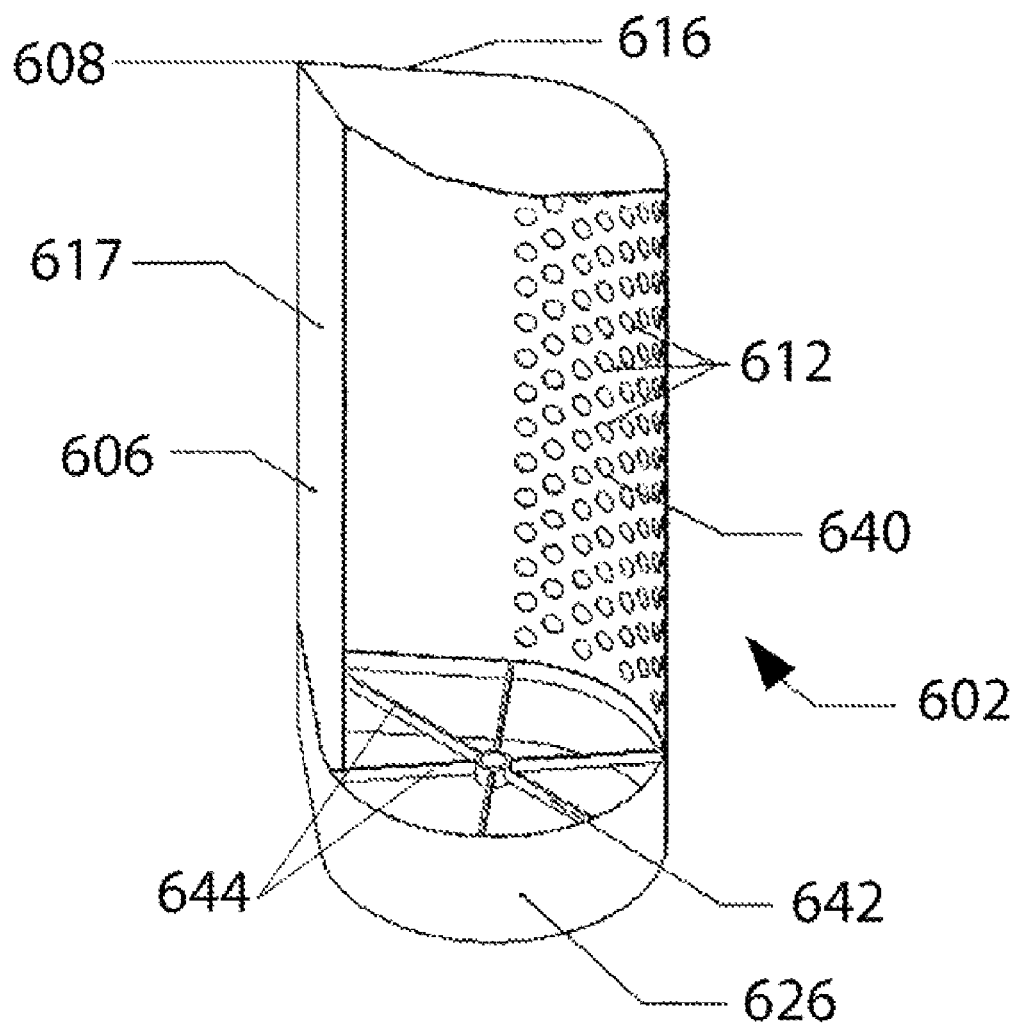

FIG. 9 is a perspective view of a shroud according to one example embodiment of the present disclosure.

Figure 10:
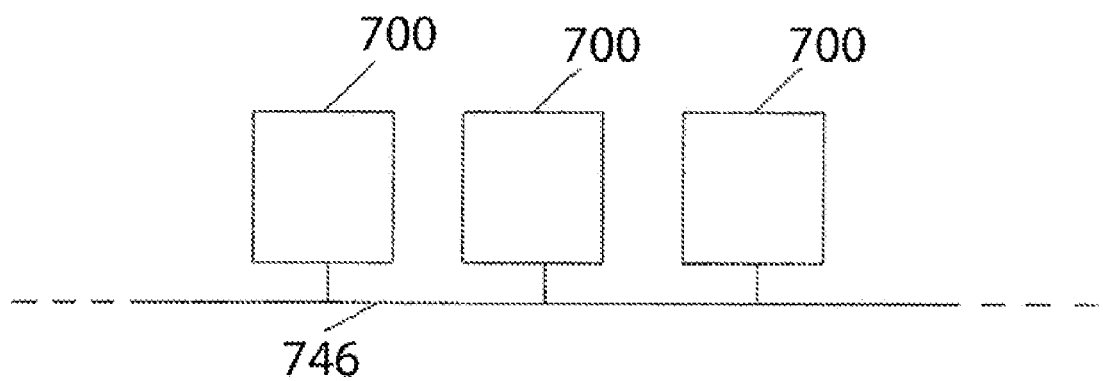

FIG. 10 is a block diagram of an electrical system including a grid according to another example embodiment of the present disclosure.

Figure 11:
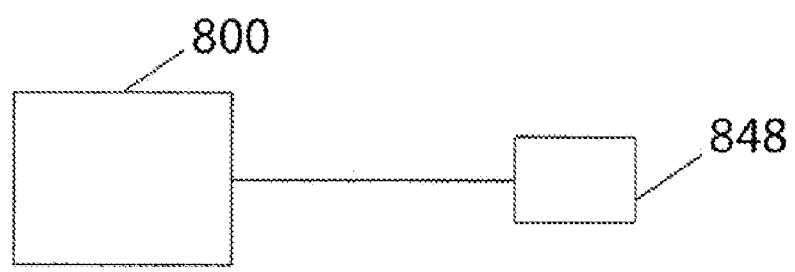

FIG. 11 is a block diagram of an electrical system including a battery according to yet another example embodiment of the present disclosure.

Figure 12:
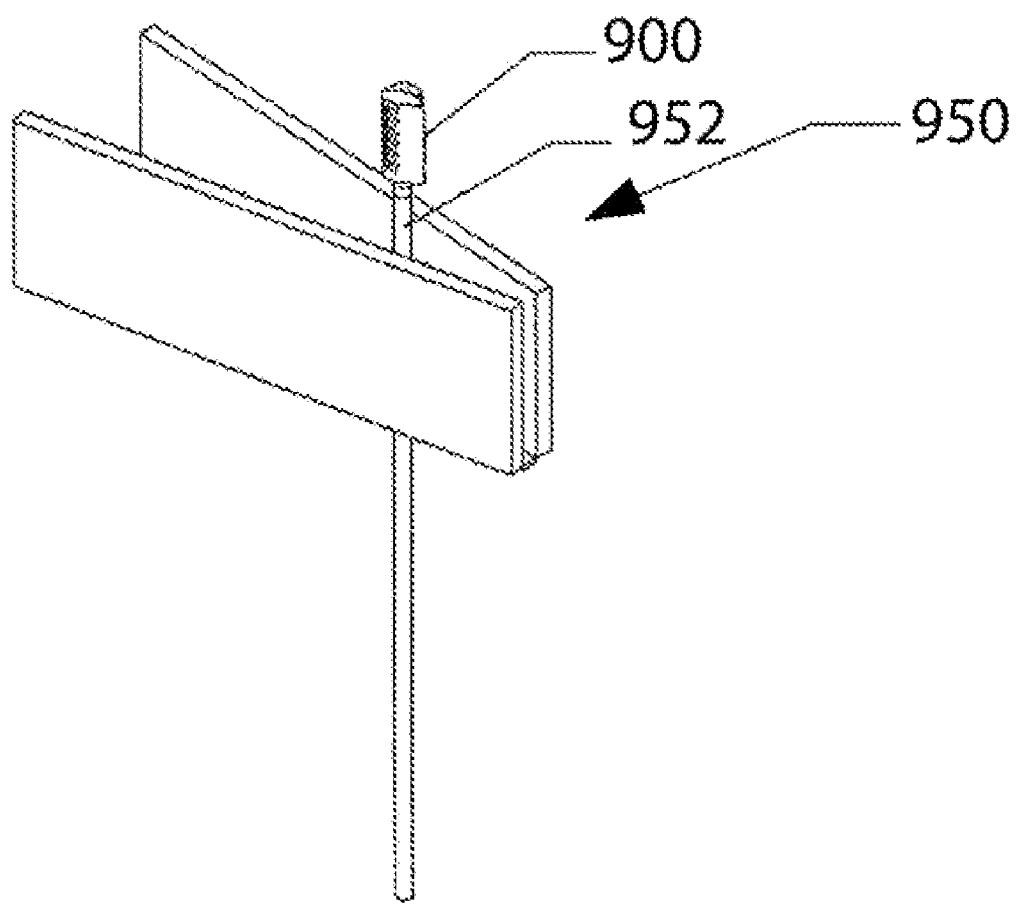

FIG. 12 is a perspective view of a billboard assembly according to one example embodiment of the present disclosure.

Figure 13:
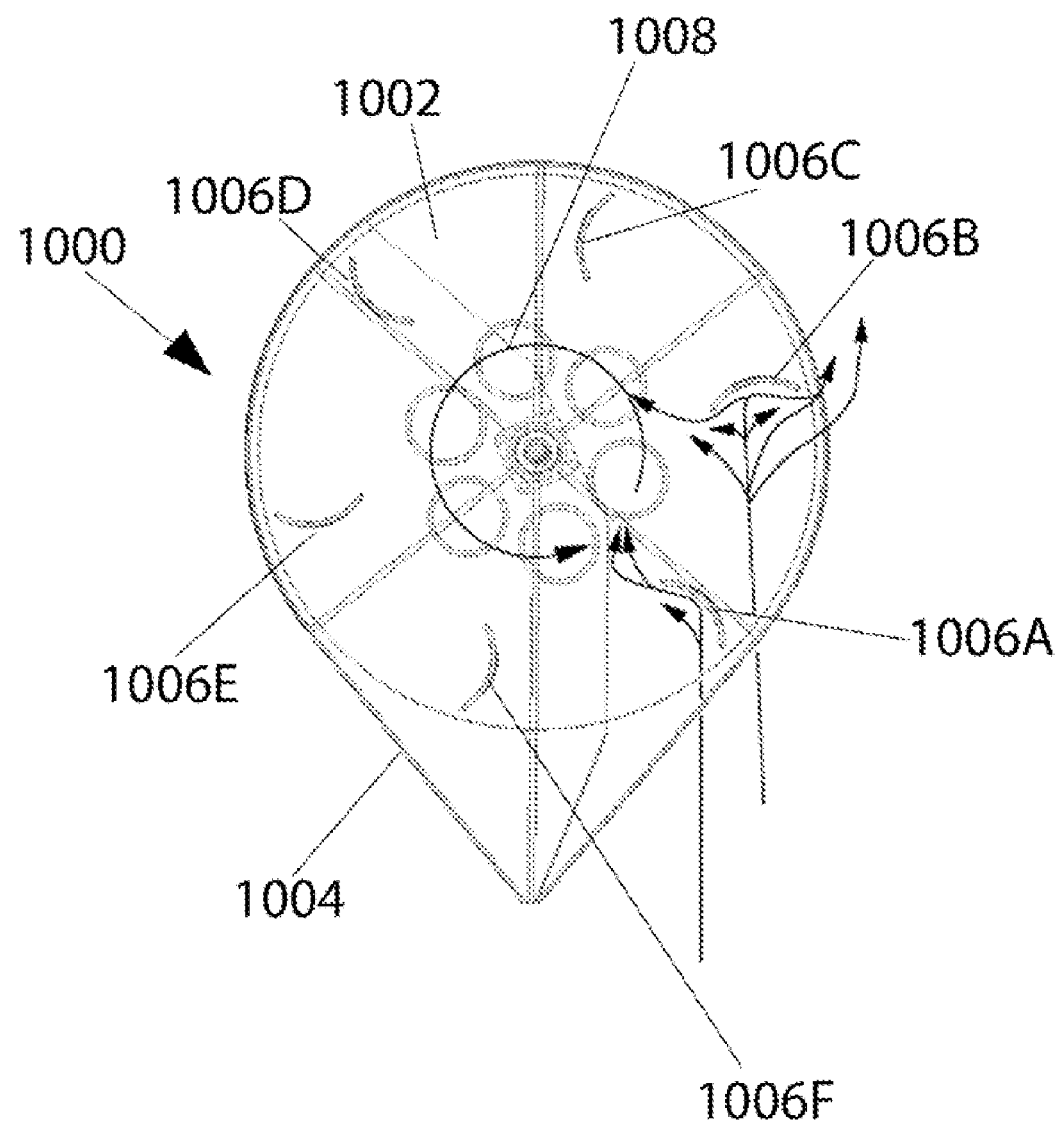

FIG. 13 is a plan view of an exemplary embodiment of a fluid turbine device in which fluid flow is represented by arrows.

Figure 14:
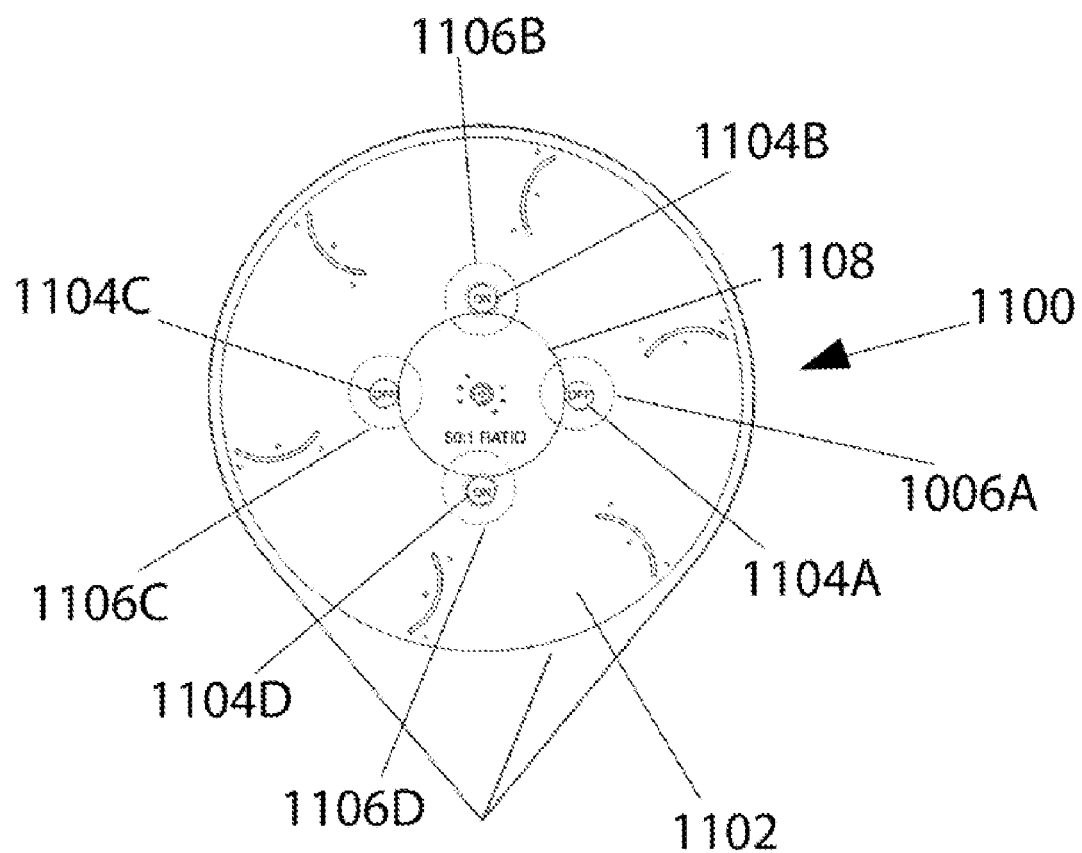

FIG. 14 is a plan view of the fluid turbine device of an exemplary embodiment of a fluid turbine device having multiple generators and a vertical blade assembly coupled to the generators via a 50:1 gear.

Figure 15:
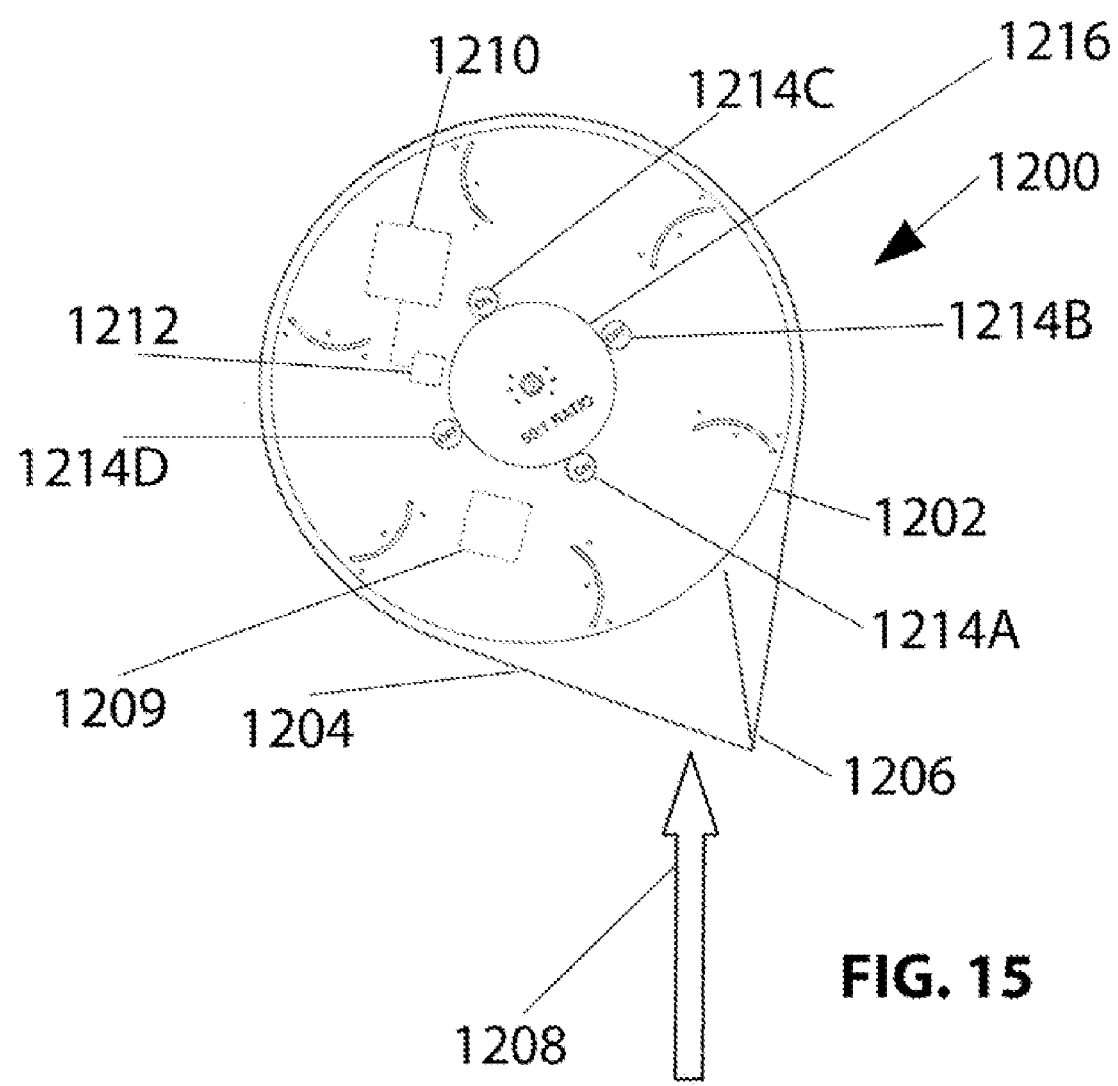

FIG. 15 illustrates an exemplary embodiment of a fluid turbine device in which fluid flow is represented by the arrow and offset from a leading edge of a vertical blade assembly of the fluid turbine device.

Figure 16:
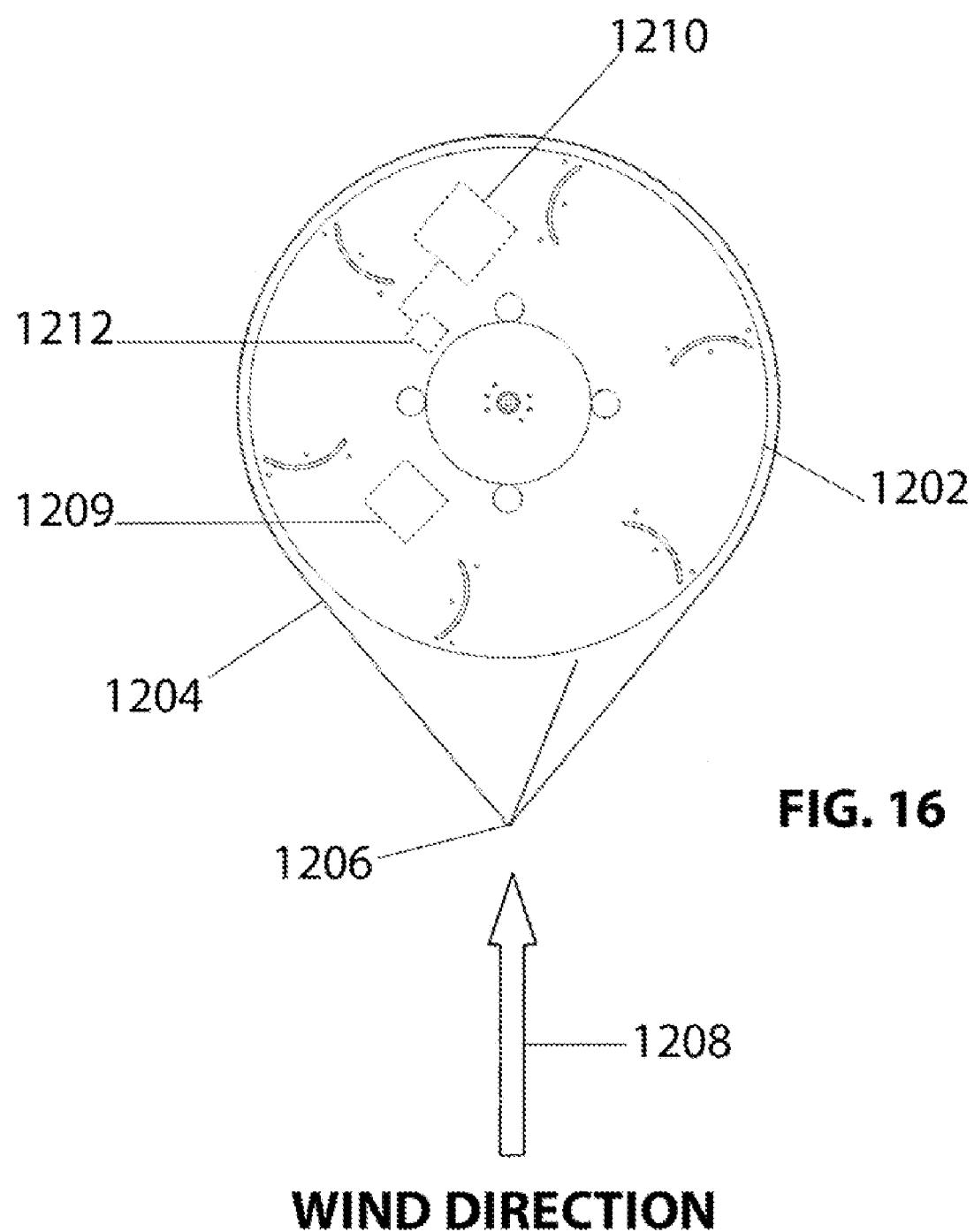

FIG. 16 illustrates the fluid turbine device of FIG. 15 after the vertical blade assembly is oriented into the direction of the fluid flow.

Figure 17A:
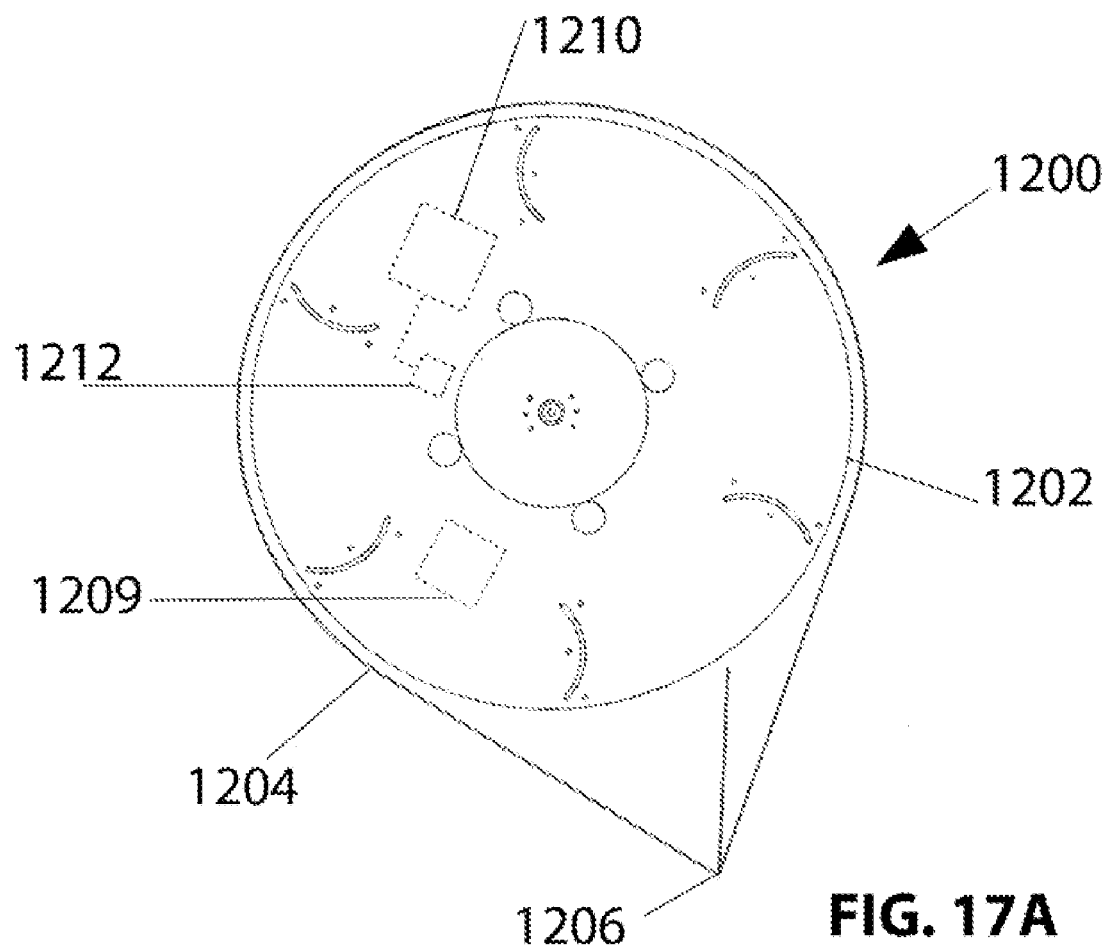

FIGS. 17A-B illustrates the vertical blade assembly of FIG. 15 being oriented clockwise and counter-clockwise relative to the direction of the fluid flow.

Figure 18:
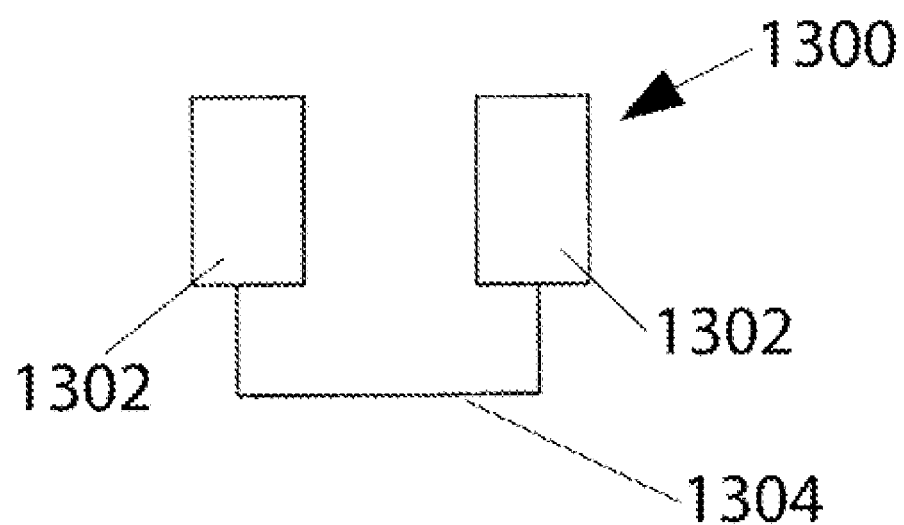

FIG. 18 is a block diagram of an exemplary embodiment that includes two fluid turbine devices coupled and/or ganged together, for operating collectively and/or simultaneously on a platform, structure, or other mounting apparatus.

Figure 19:
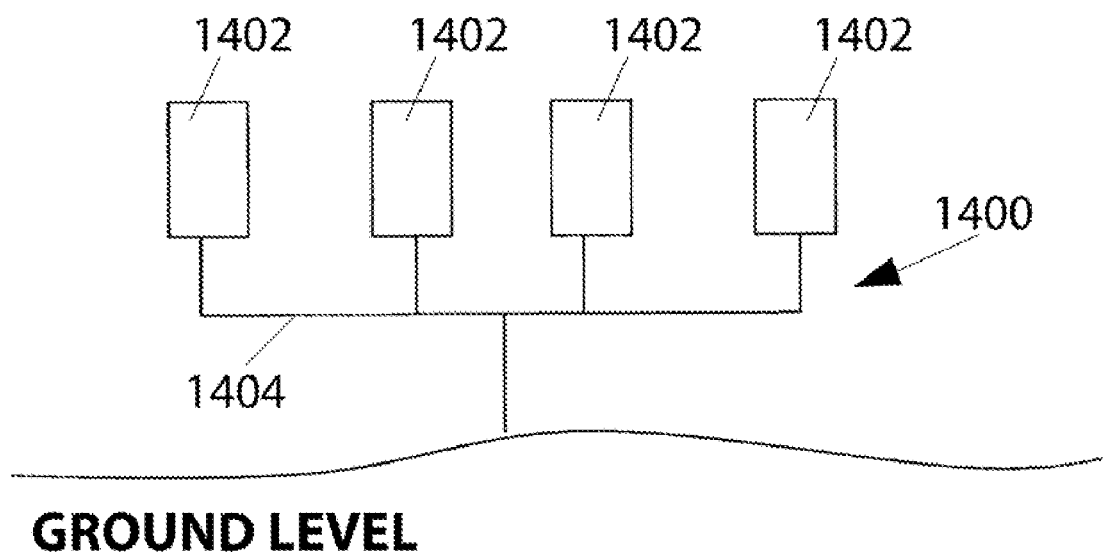

FIG. 19 is a block diagram of an exemplary embodiment that includes four fluid turbine devices coupled and/or ganged together, for operating collectively and/or simultaneously on a platform, structure, or other mounting apparatus.

Figure 20:
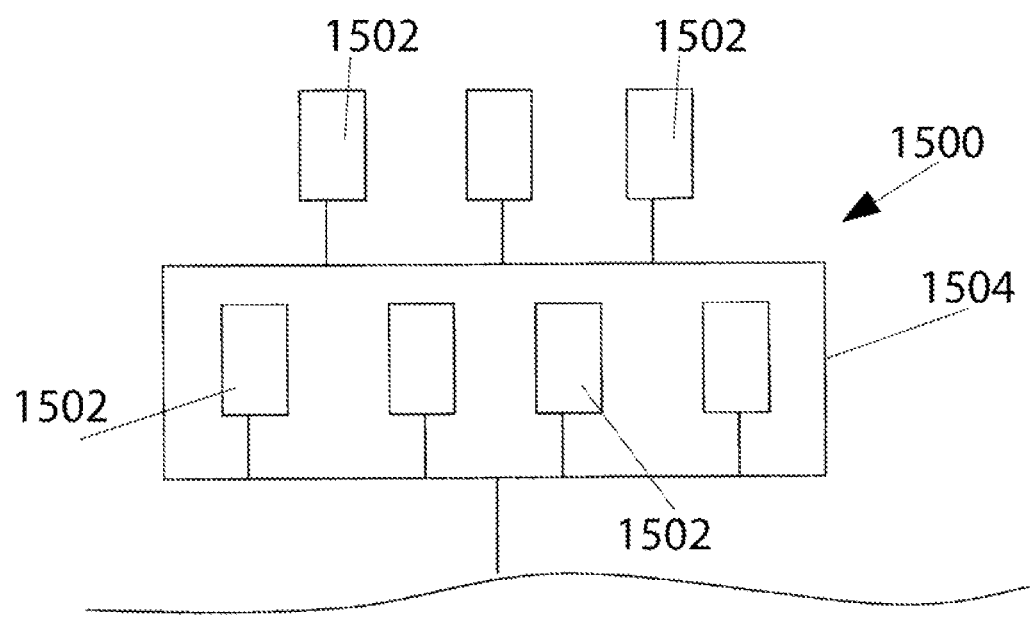

FIG. 20 is a block diagram of an exemplary embodiment that includes seven fluid turbine devices coupled and/or ganged together, for operating collectively and/or simultaneously on stacked upper and lower platforms, structures, or other mounting apparatus.

Figure 21:
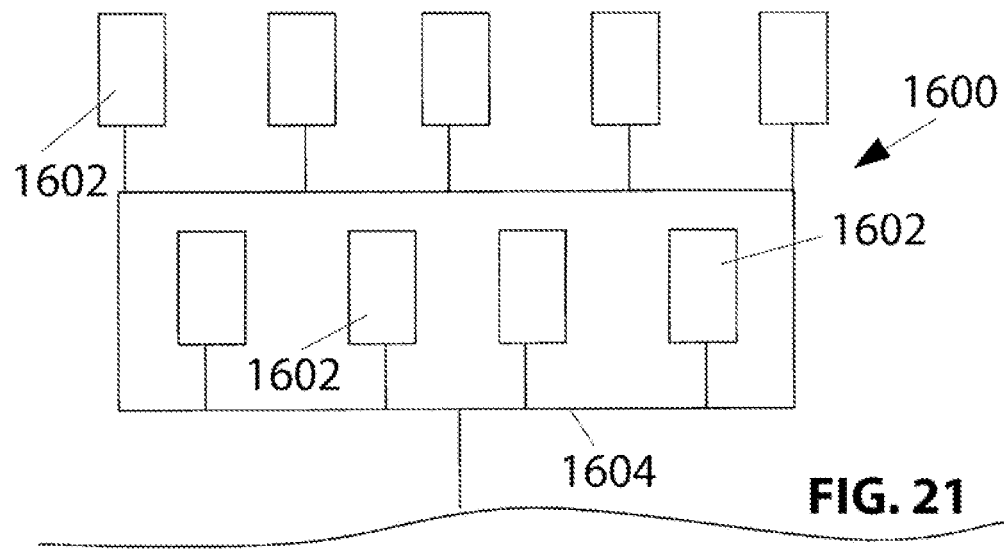

FIG. 21 includes a block diagram of an exemplary embodiment that includes two vertically stacked rows of fluid turbines devices coupled and/or ganged together, for operating collectively and/or simultaneously on stacked platforms, structures, or other mounting apparatus.

Figure 22:
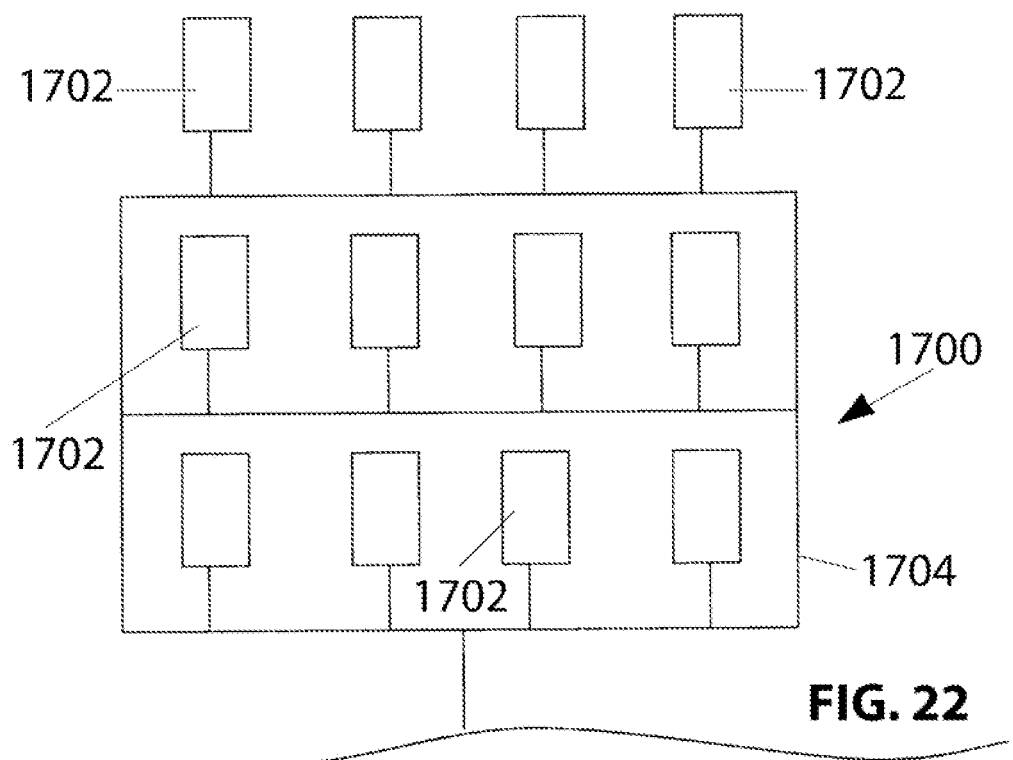

FIG. 22 includes a block diagram of an exemplary embodiment that includes three vertically stacked rows of fluid turbines devices coupled and/or ganged together, for operating collectively and/or simultaneously on stacked platforms, structures, or other mounting apparatus.

Figure 23:
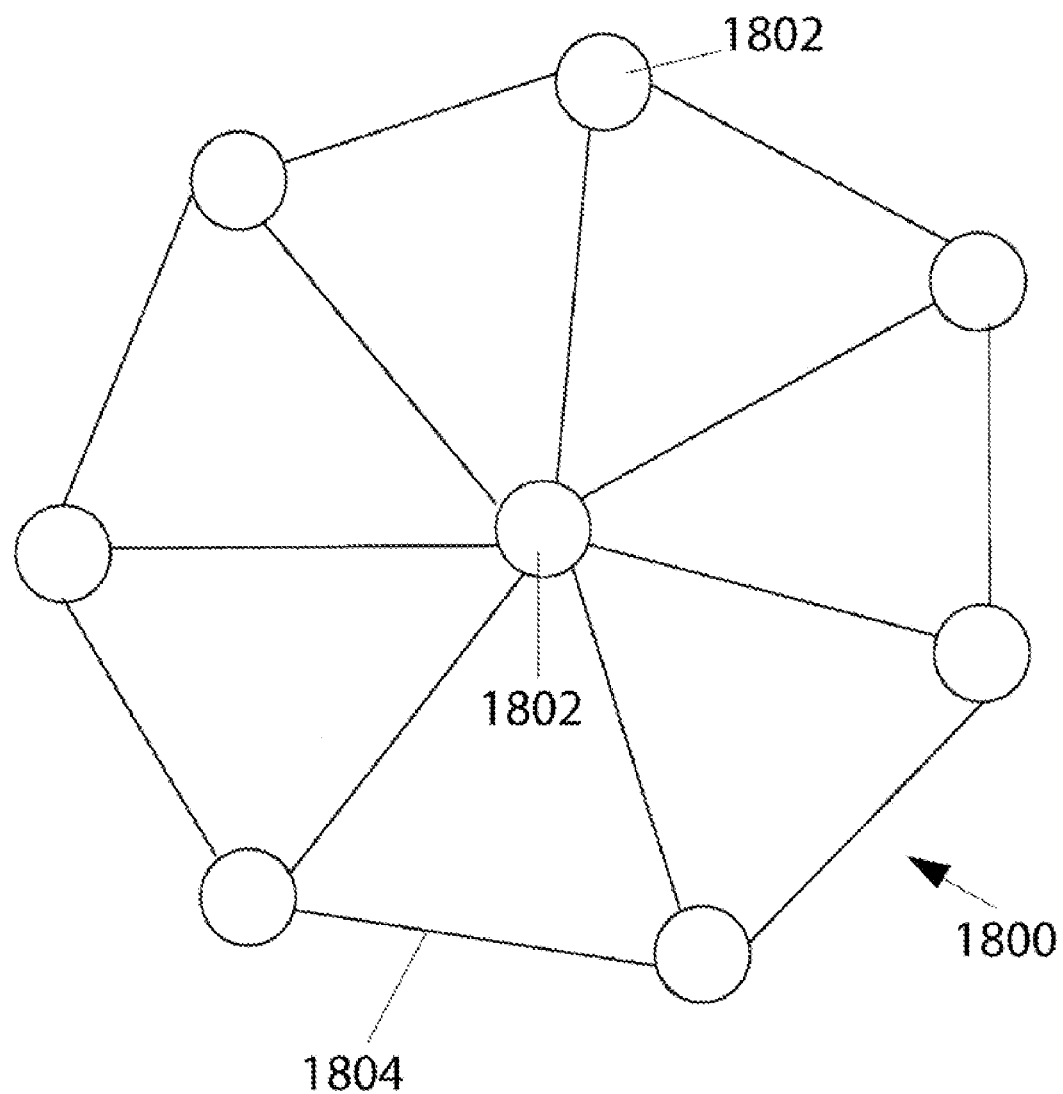

FIG. 23 is a block diagram of an exemplary embodiment that includes eight fluid turbine devices coupled and/or ganged together in a heptagonal configuration, for operating collectively and/or simultaneously on a platform, structure, or other mounting apparatus.

Figure 24:
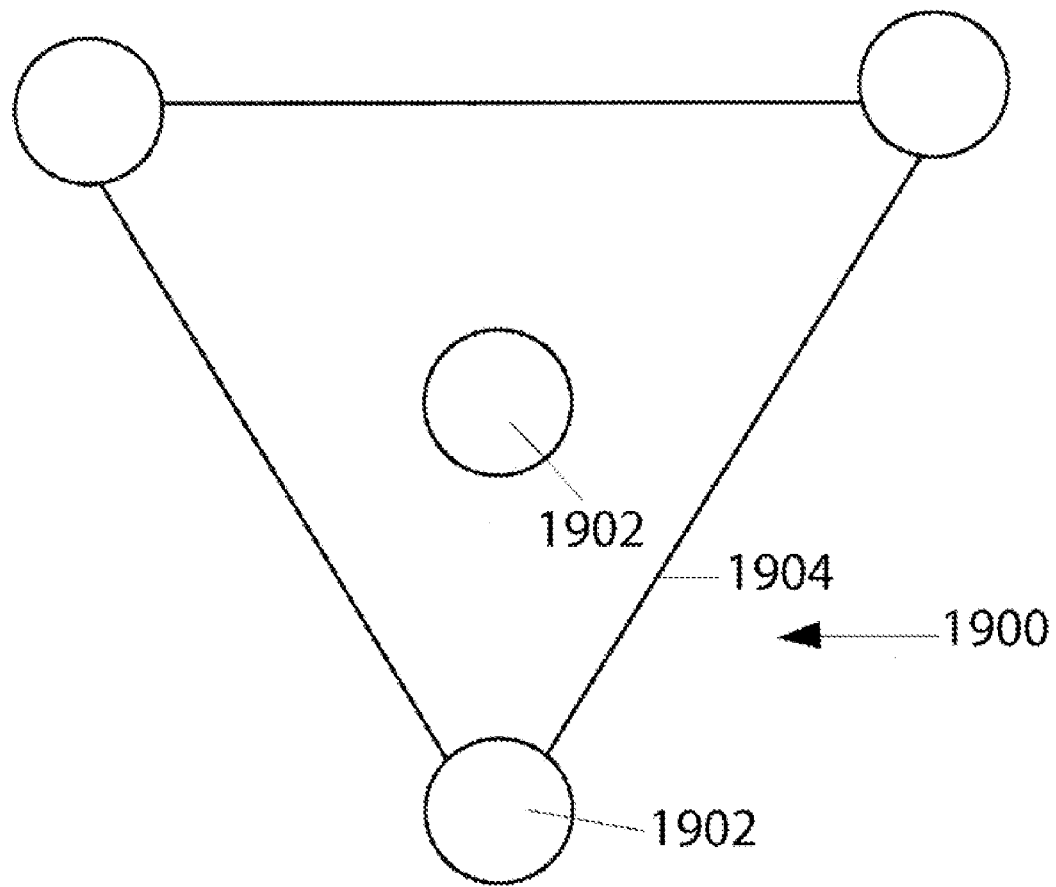

FIG. 24 is a block diagram of an exemplary embodiment that includes four fluid turbine devices coupled and/or ganged together in a triangular configuration, for operating collectively and/or simultaneously on a platform, structure, or other mounting apparatus.

Figure 25:
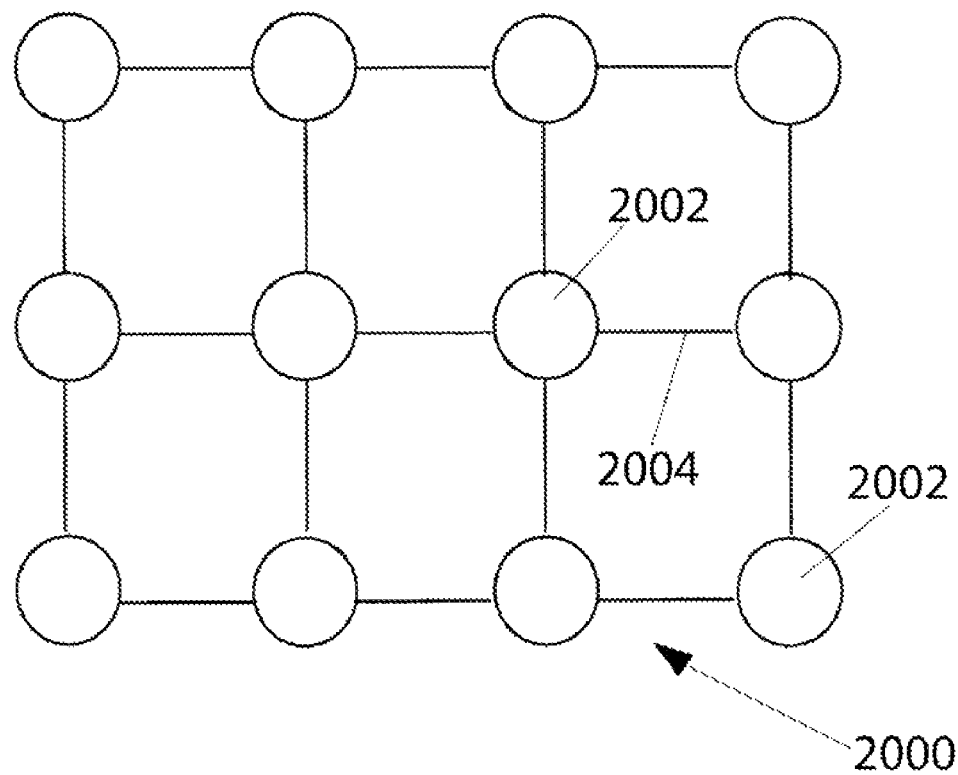

FIG. 25 is a block diagram of an exemplary embodiment that includes twelve fluid turbine devices coupled and/or ganged together in a rectangular array that includes 3 rows and four columns, for operating collectively and/or simultaneously on a platform, structure, or other mounting apparatus.

Figure 26:
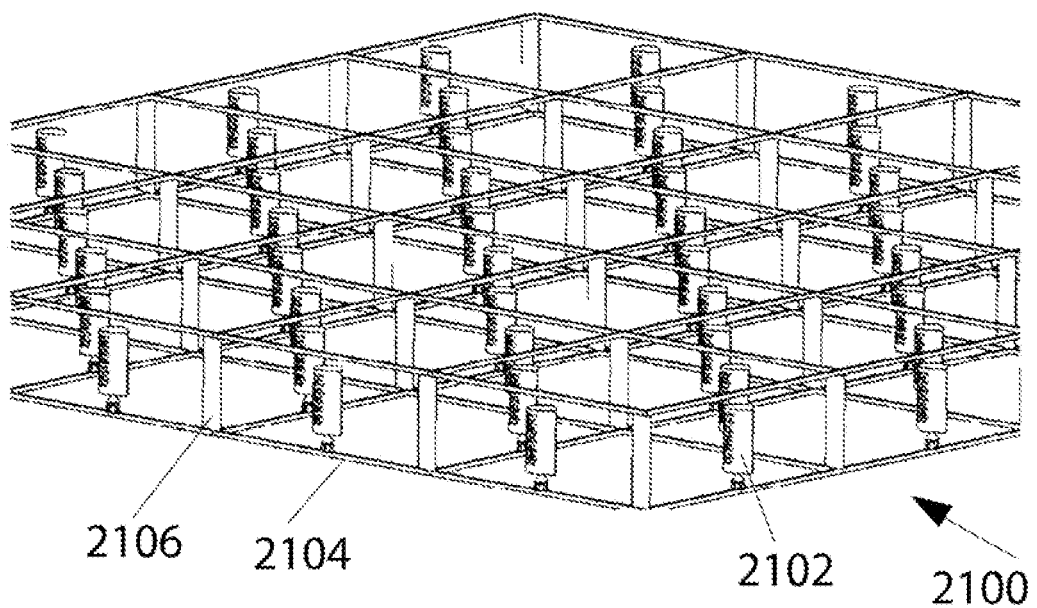

FIG. 26 is a perspective view illustrating an exemplary embodiment in which a plurality of fluid turbine devices are supported by a framework or structure having pillars or vertical support members with an airfoil configured to direct laminar flow through the structure thus reducing turbulence.

Figure 27:
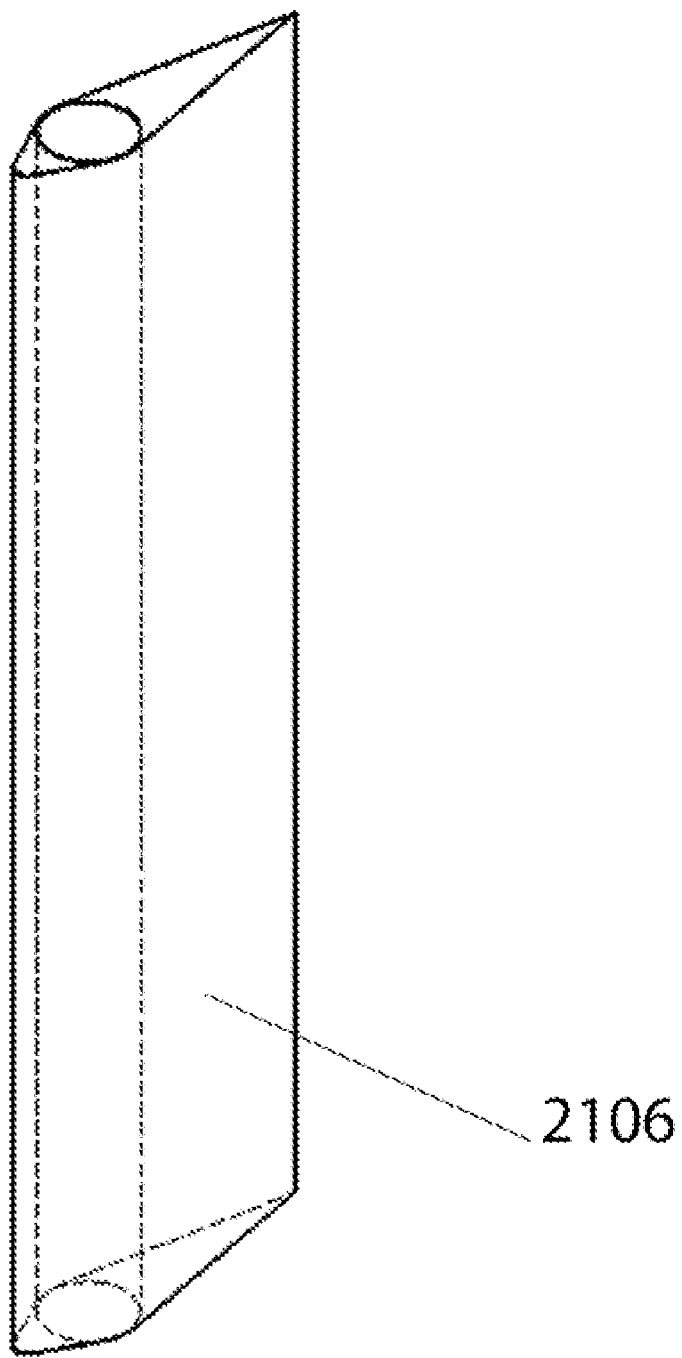

FIG. 27 is a perspective view illustrating an example of a pillar or vertical support that that may be used in the structure shown in FIG. 26.

Figure 28:
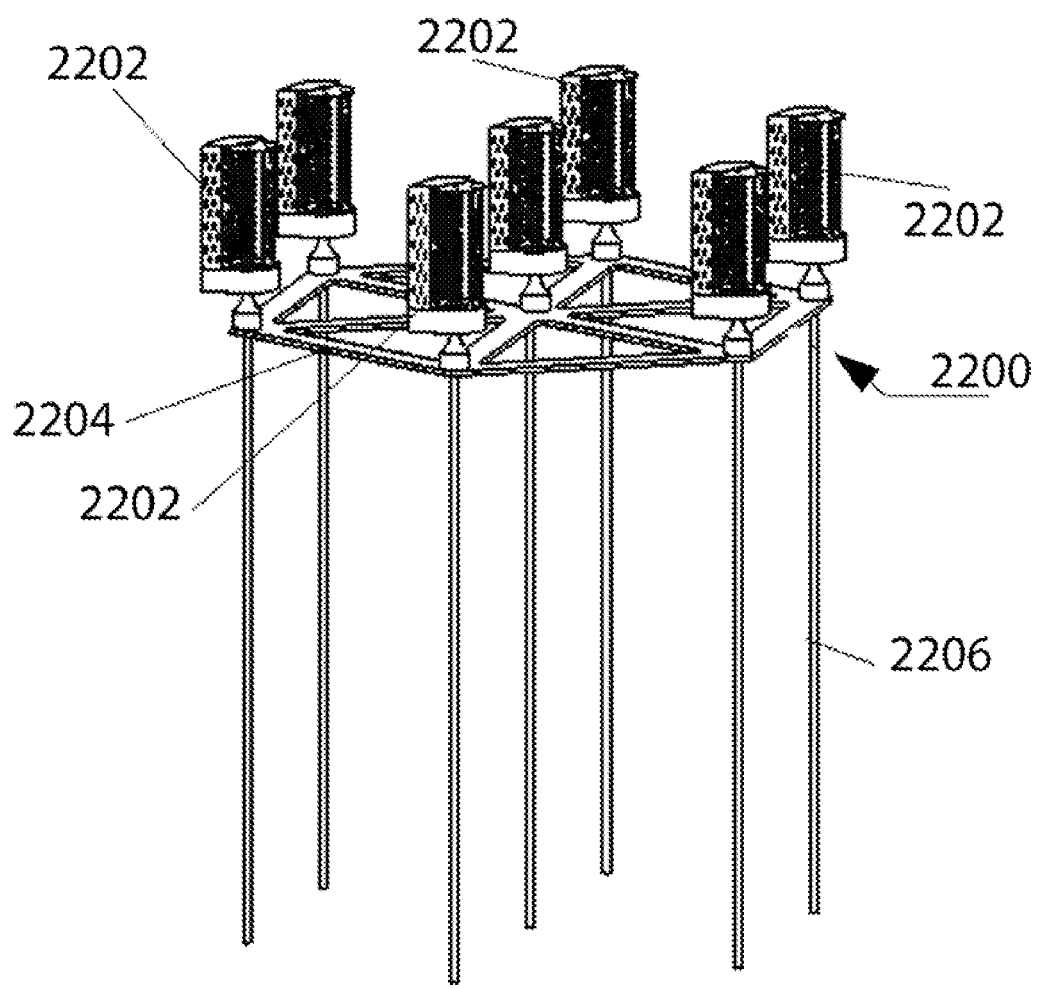

FIG. 28 is a perspective view illustrating an exemplary embodiment in which a plurality of fluid turbine devices are supported by a structure.

Figure 29A:
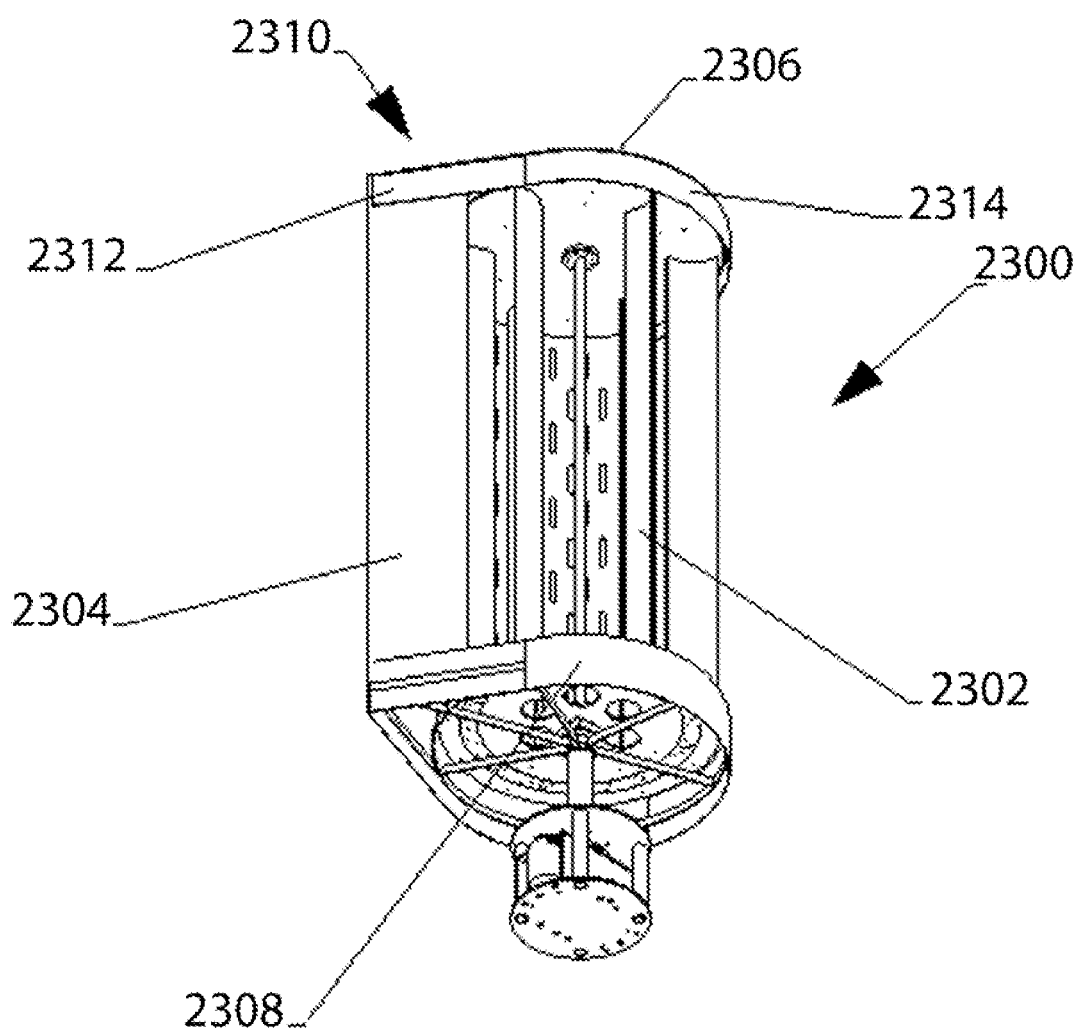
Figure 29B:
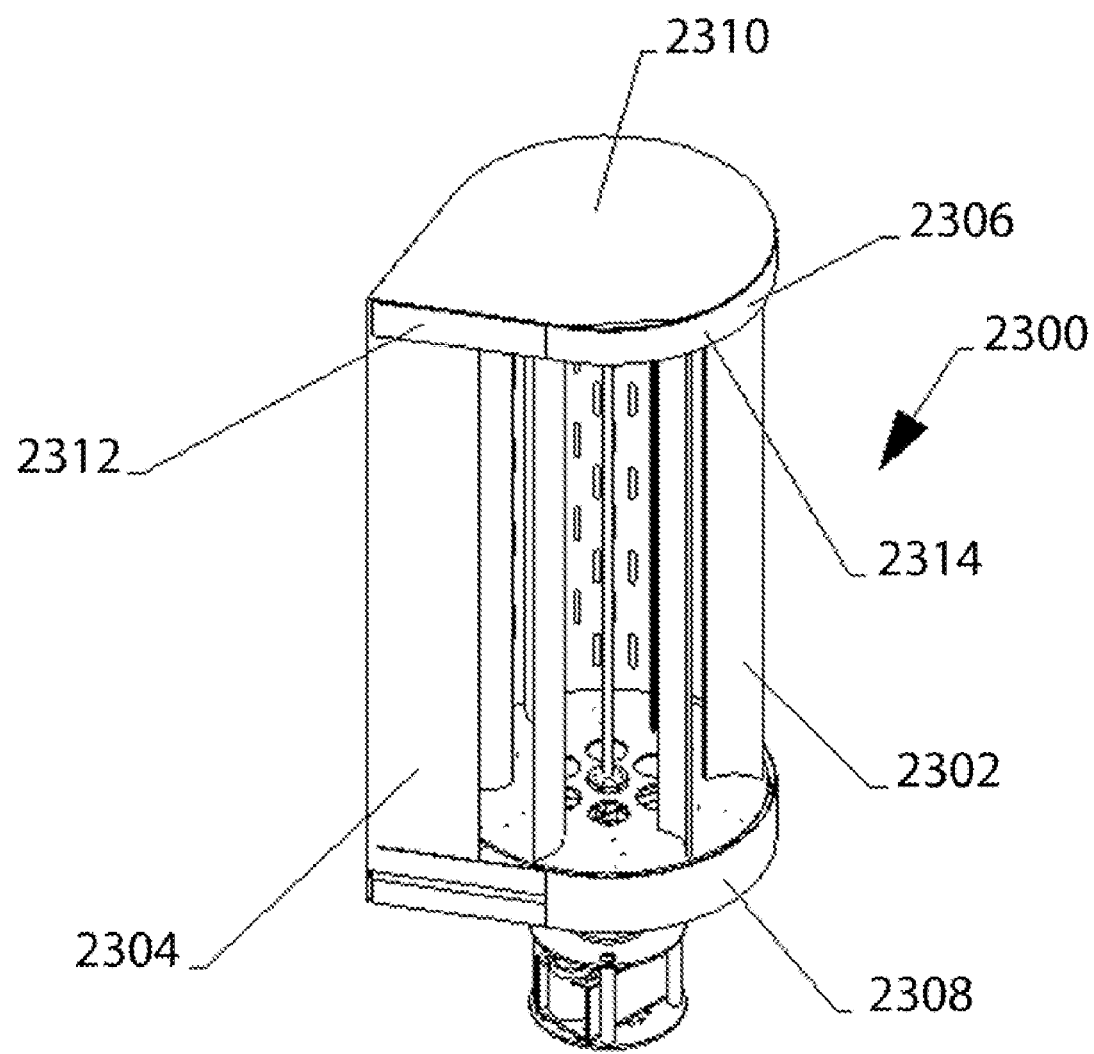

FIGS. 29A-B are perspective views of a fluid turbine device according to another example embodiment of the present disclosure.

DETAILED DESCRIPTION

Example embodiments will now be described more fully with reference to the accompanying drawings.

Figure 2:
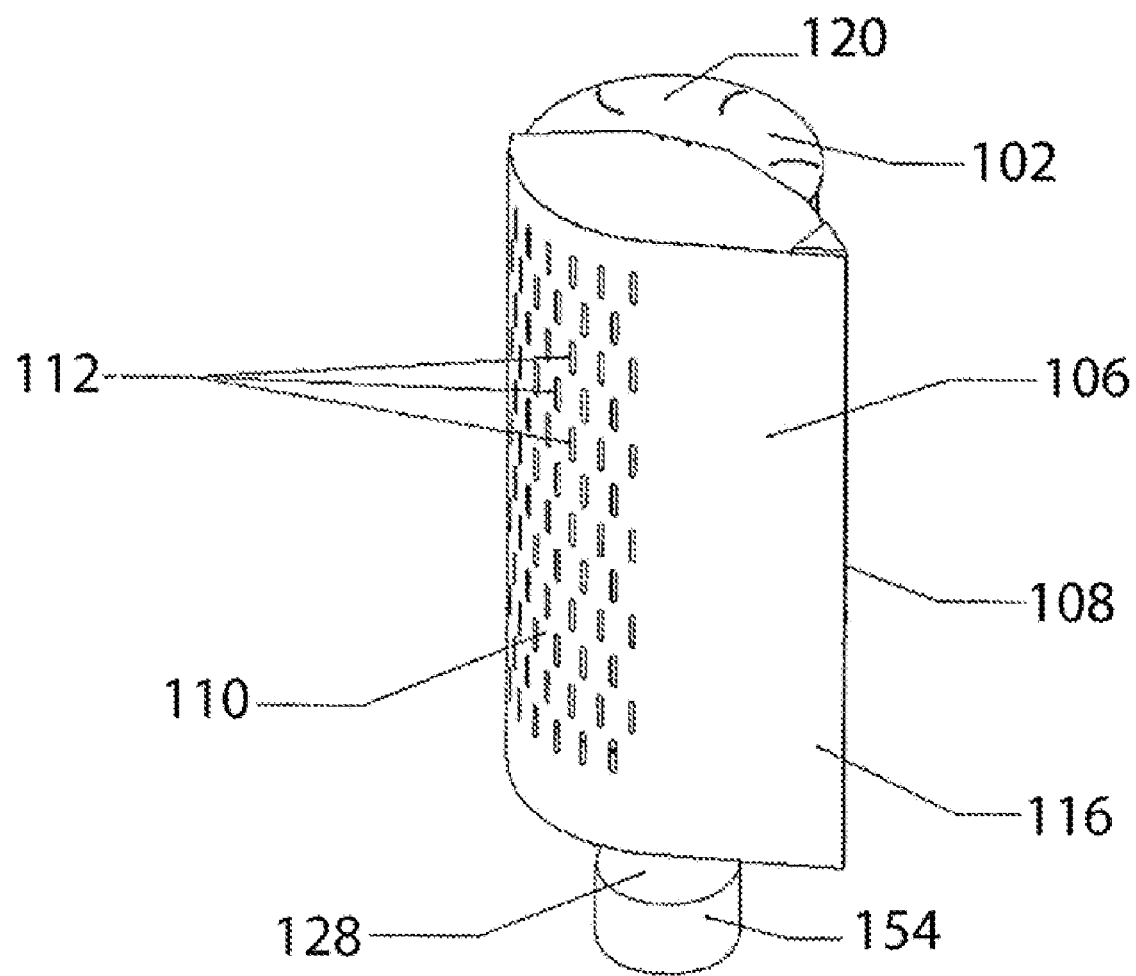
FIG. 2 is a perspective view of the fluid turbine device of FIG. 1.

FIGS. 1 and 2 illustrate one exemplary embodiment of a fluid turbine device 100 suitable for practicing one or more methods disclosed herein. It should be understood, however, that the teachings of the present disclosure are not limited to the example fluid turbine devices, wind farms and systems described below, and that other embodiments of fluid turbine devices, wind farms and systems may employ one or more aspects of the methods of the present disclosure.

The fluid turbine device 100 includes a vertical blade assembly 102 having multiple blades 104 and a shroud 106. The shroud 106 is rotatable relative to the vertical blade assembly 102. The shroud 106 includes a leading edge portion 108 for deflecting a portion of a fluid flow from entering a return path of the vertical blade assembly 102. The shroud 106 also includes a portion 110 defining multiple openings 112. When fluid flows relative to the fluid turbine device 100, a pressure differential is generated between a compartment 114 and an area adjacent the multiple openings 112. The pressure differential (and Bernoulli's principle) provides conditions for fluid flow from the compartment 114. In some embodiments, the shroud 106 defines at least a portion of an airfoil shape. Accordingly, the multiple openings 112 permit fluid flow from within the compartment 114 defined by the vertical blade assembly 102 to exhaust out of the return path. It should be appreciated that a different number and/or configuration of openings may be defined in one or more portions of a shroud to adjust fluid flow through the shroud, thereby adjusting fluid flow relative to a fluid turbine device to, for example, alter fluid flow turbulence relative to the fluid turbine device.

Figure 3:
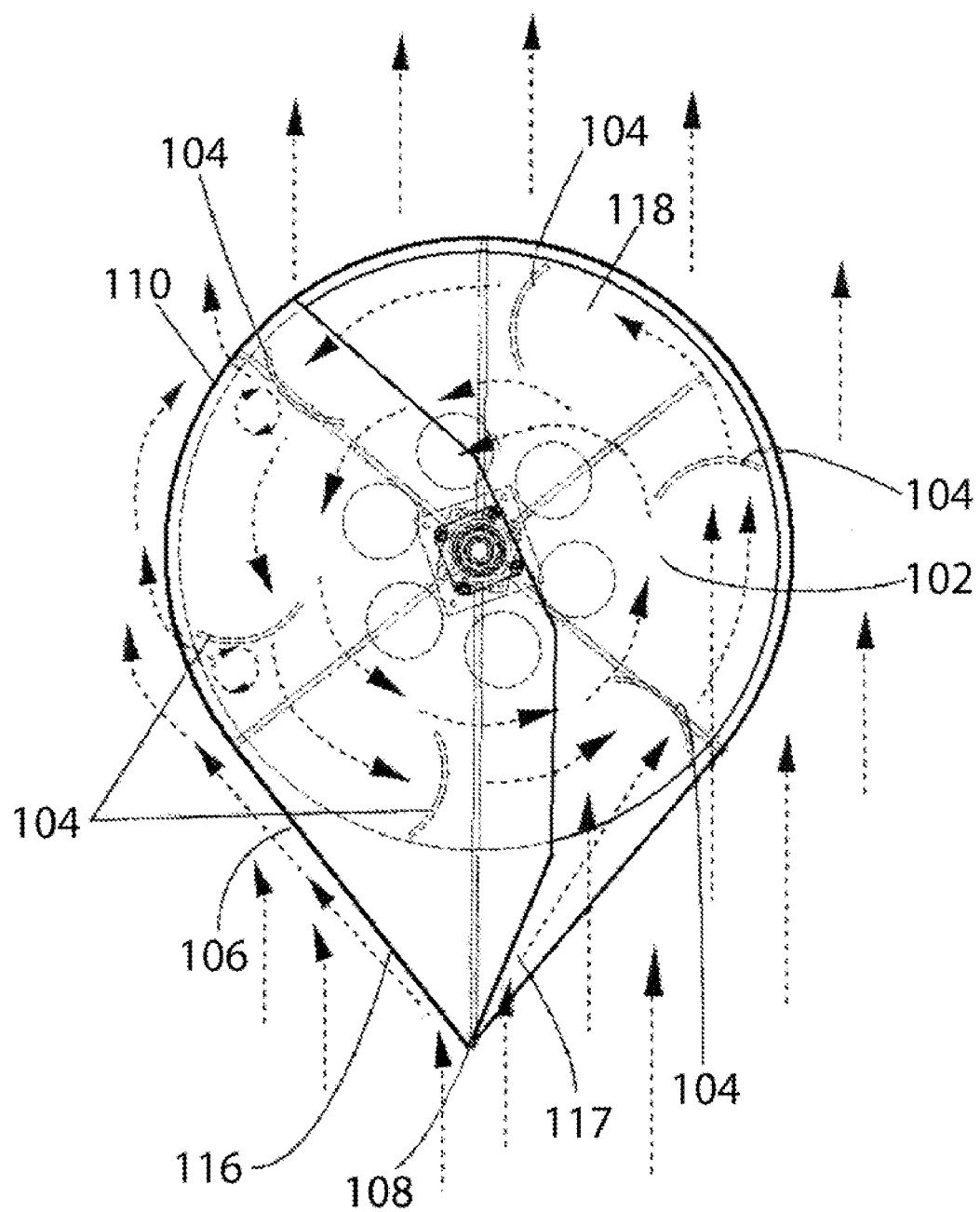
FIG. 3 is a plan view of the fluid turbine device of FIG. 1 showing fluid flow represented by arrows.
Figure 4A:
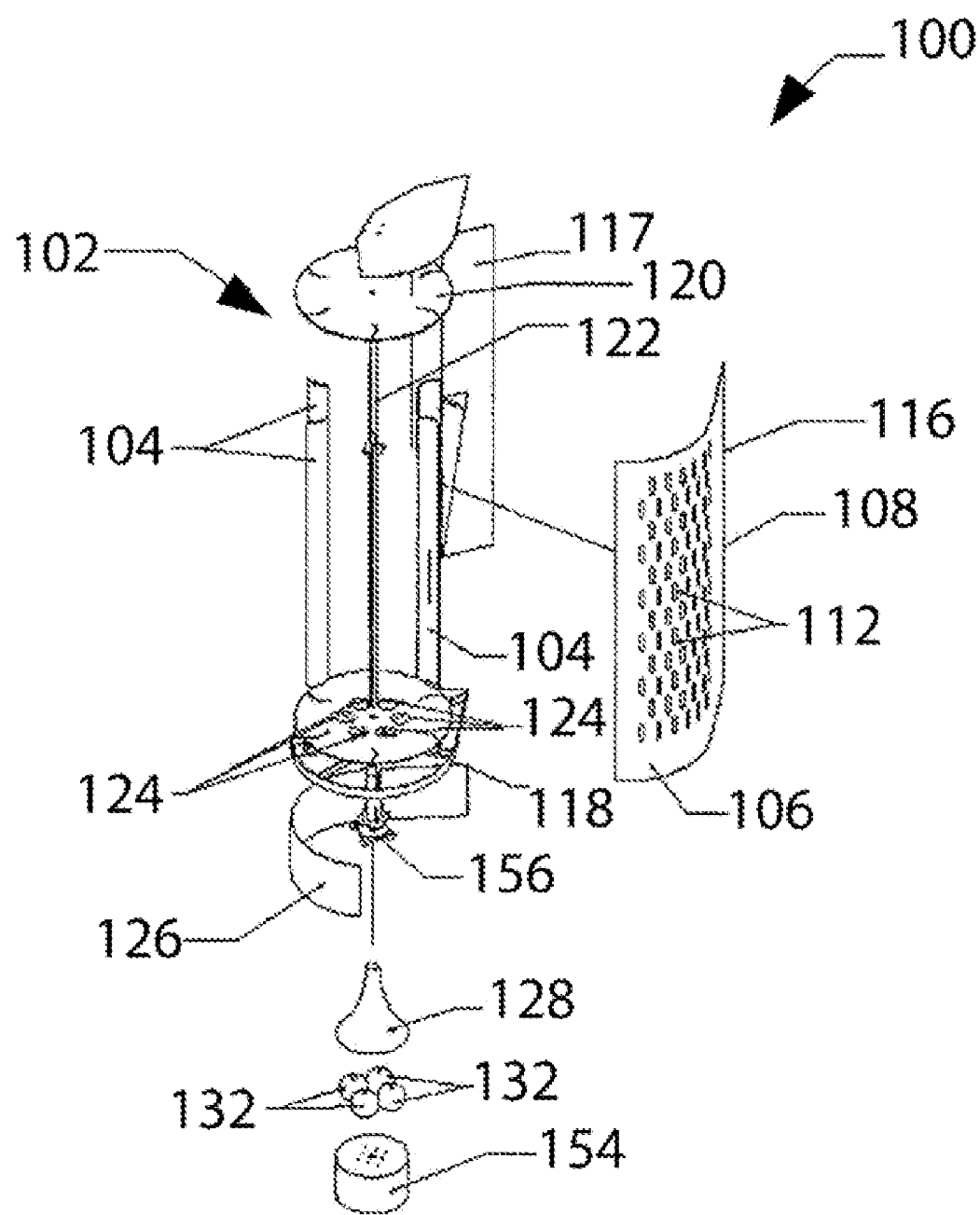
Figure 4B:
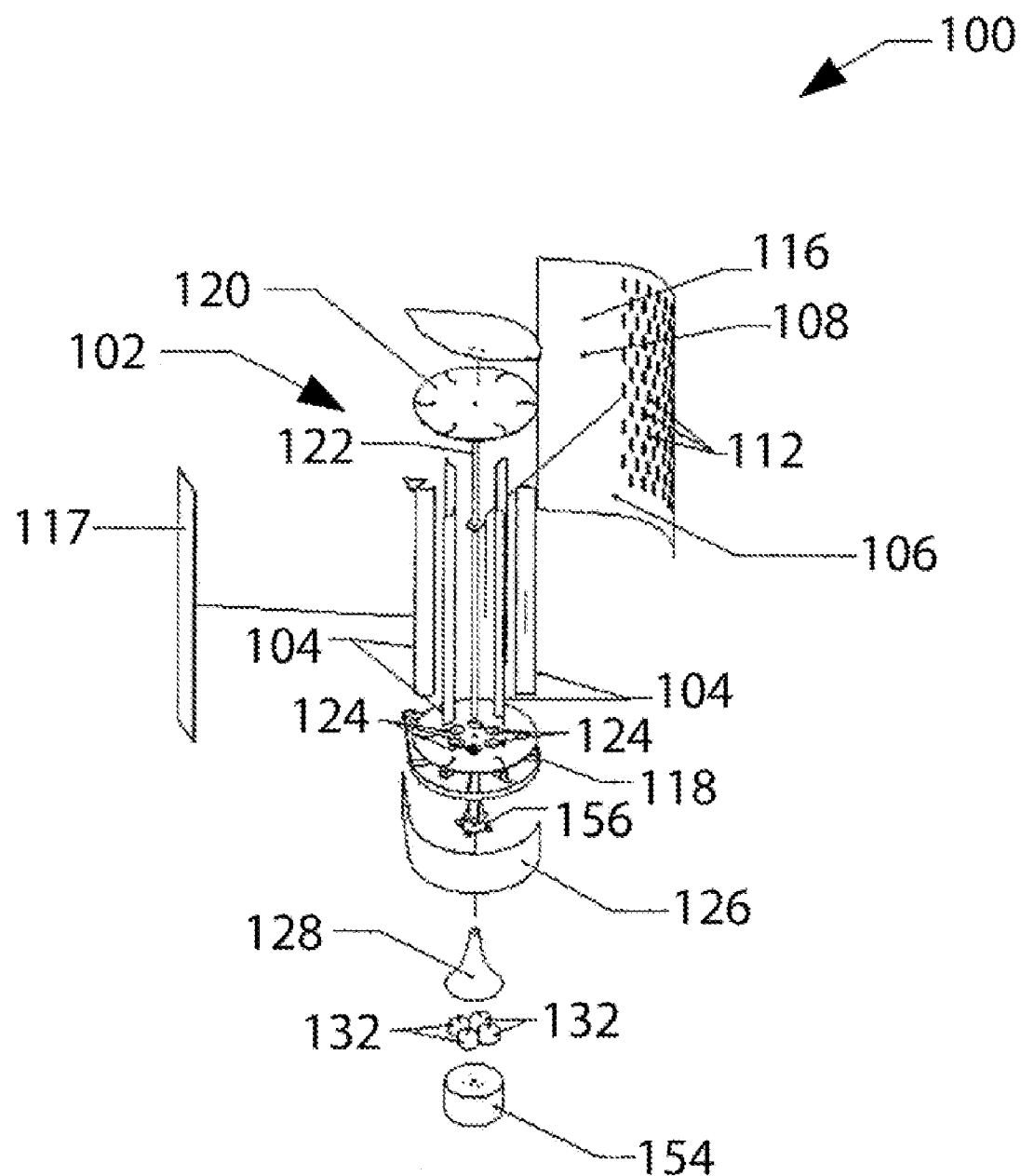
Figure 4C:
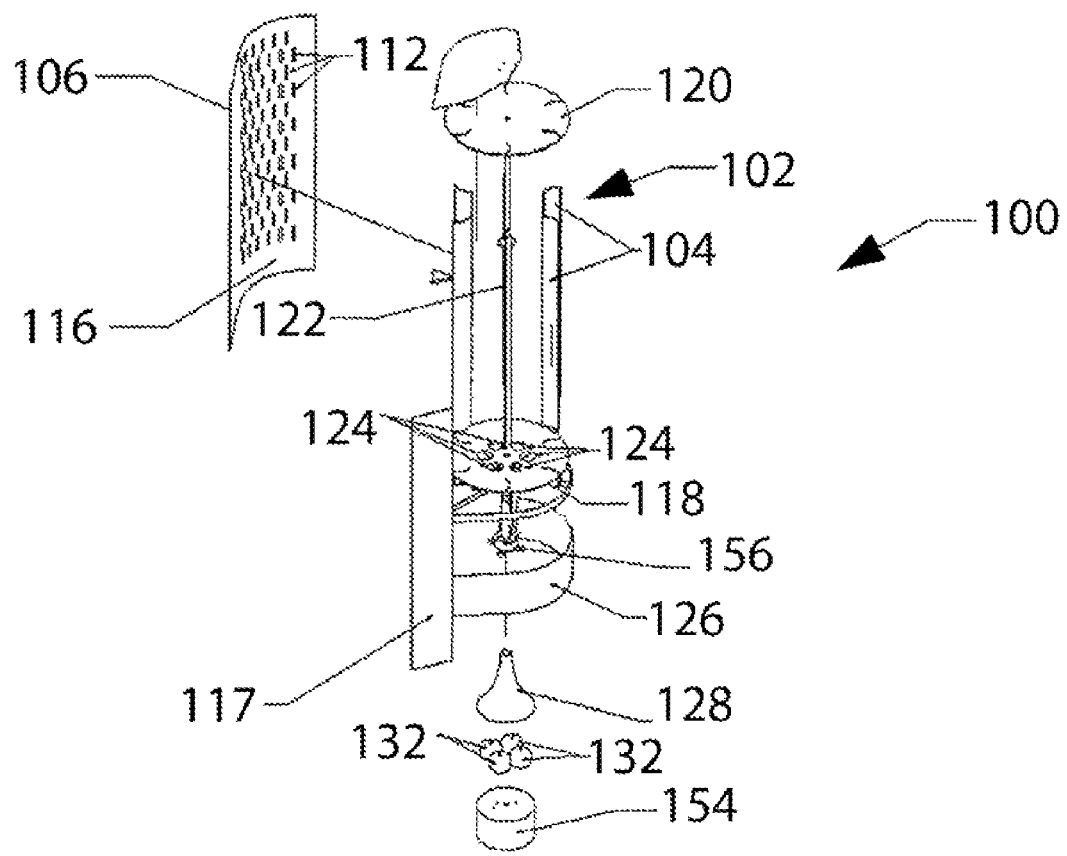
Figure 4D:
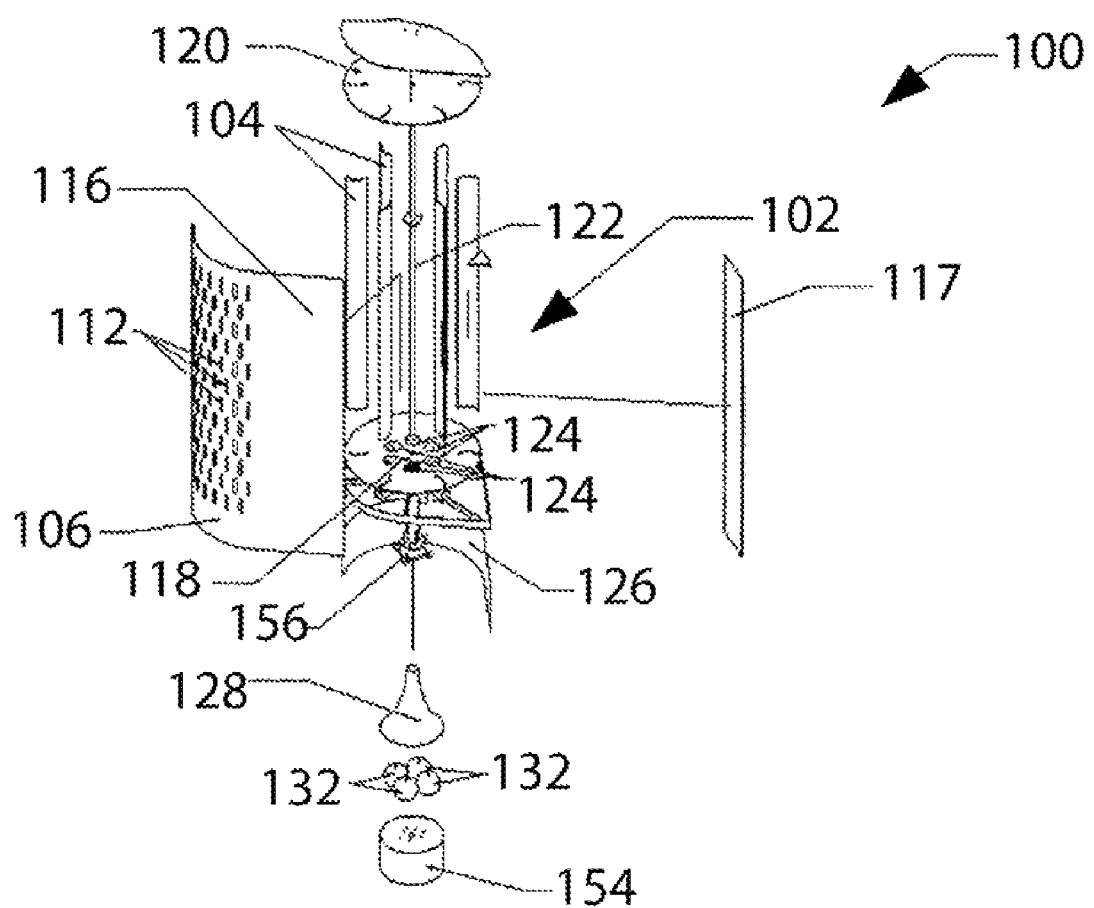

As shown in FIG. 3, the leading edge portion 108 of the shroud 106 is oriented in the direction of the fluid flow. In this particular embodiment, the fluid flow is wind. In other embodiments, a different fluid, e.g., water, etc., may be utilized by a fluid turbine device. The wind flow relative to the fluid turbine device 100 is shown in dotted lines with arrowheads. Wind flow is divided by the leading edge portion 108 of the fluid turbine device 100. Wind flow is deflected by the leading edge portion 108 around an external surface of the shroud 106 on the left side as shown in FIG. 3, but external to the vertical blade assembly 102. In this exemplary manner, wind flow is deflected from entering a return path of the fluid turbine device 100 on the side. On a right side of the fluid turbine device, as shown in FIG. 3, wind flow is permitted to enter a drive path of the vertical blade assembly 102, thereby rotating the vertical blade assembly 102 relative to the shroud 106.

By limiting the fluid flow into the return path of the vertical blade assembly 102, the fluid turbine device 100 may operate with reduced fluid resistance to provide efficient operation of the vertical blade assembly 102. Additionally, or alternatively, the laminar flow about the leading edge portion 108 of the shroud 106 deflects wind flow about the fluid turbine device 100, effectively reducing direct wind flow contact (perpendicular to a surface) with fluid turbine device 100 (except for the blades 104 in the drive path). By limiting the direct wind flow contact, wind flow force on the overall fluid turbine device 100 and its support structure is also reduced, while providing efficient use of applied loads for generation of power.

As shown in FIG. 3, the leading edge portion 108 includes a surface 116 for deflecting a portion of a fluid flow in one direction to inhibit entry into the return path and a surface 117 at an angle relative to the surface 116, for deflecting a portion of the fluid flow in a different direction towards a drive path of at least a portion of the vertical blade assembly 102. The surface 116 is angled relative to the surface 117, at about 61 degrees. Other shapes, sizes and configuration (e.g., angles greater or less than 61 degrees, etc.) of surfaces including a leading edge portion may be employed in other embodiments of a fluid turbine device. In some embodiments, a surface for deflecting fluid towards a drive path may be omitted.

It should also be appreciated that different shapes and/or sizes of fluid turbine devices may be employed in other embodiments. Specifically, the ratio of the diameter (of the vertical blade assembly 102) to the height of the fluid turbine device 100 is about 1:2. A ratio of height to radius, the radius, and/or the height may be different, potentially based on one or more characteristics of an intended installation site or an environment (such as typical wind speed, densities of wind impediments buildings, trees, etc.), required rotational/electrical output, manufacturing/fabrication, etc. Further, a different number, size, and/or configuration of blades may be included in other vertical blade assembly embodiments to affect fluid flow in a drive path, a return path, and/or fluid exhaust from a fluid turbine device. Additionally, although the fluid turbine device 100 defines an axis perpendicular to ground in the embodiment shown in FIGS. 1 and 2, it should be further appreciated that a fluid turbine device may be disposed such that the axis of the fluid turbine device is at a different angle relative to ground, e.g., parallel, non-perpendicular, etc.

As shown in the exploded views of FIGS. 4A-D, the vertical blade assembly 102 includes end plates 118, 120 disposed on opposite ends of the multiple blades 104. The multiple blades 104 are evenly distributed about the central axis 122 of the vertical blade assembly 102, and substantially at the edge of the end plates 118, 120. Each of the six blades 104 is disposed such that the end points of the blades are collinear to the central axis 122 of the vertical blade assembly 102. In other embodiments, a different number, size, type, configuration, and/or placement of blades may be employed in a vertical blades assembly.

As shown in FIGS. 4A-D, the end plate 118 includes multiple openings 124 to permit fluid flow from within the compartment 114 defined by the vertical blade assembly 102. When in use, the vertical blade assembly 102 rotates as a function of the wind flow entering the drive path of the vertical blade assembly 102. Rotation of the vertical blade assembly 102 may contribute to the formation of a wind vortex within the vertical blade assembly 102. The wind vortex permits exhaustion of wind flow through one or more of the multiple openings 124 in the end plate 118. A different number, shape, and/or size of openings may be defined by different fluid turbine device embodiments. In at least one embodiment, a bottom end plate may be omitted.

The shroud 106 includes a shroud skirt 126. The shroud skirt 126 extends slightly above the end plate 118 to assist in formation of the wind vortex within the vertical blade assembly 102. In this particular embodiment, the shroud skirt 126 provides generally consistent laminar flow below the vertical blade assembly 102 to prevent disturbances in the laminar flow about the fluid turbine device 100 at the vertical blade assembly 102. A different configuration of a shroud skirt may be included in different shroud embodiments and employed otherwise relative to the vertical blade assembly to reduce turbulence and/or assist laminar flow.

Also shown in FIG. 1, the fluid turbine device 100 includes a cowling 128 coaxially disposed relative to the vertical blade assembly 102. The cowling 128 provides a path of low resistance for the wind vortex to be received through the openings 124 defined in the end plate 118. When the wind vortex exits the vertical blade assembly 102, the cowling 128 guides the wind vortex out and away from the fluid turbine device 100, thereby providing an exhaust path for the wind vortex. In this manner, interaction between the exhausted wind vortex and the fluid flow relative to the drive path of the vertical blade assemble 102 may be limited, thereby providing efficient operation of the fluid turbine device 100. As the wind vortex is exhausted through the multiple openings 124 defined in the end plate 118 and deflected by the cowling 128, additional wind flow enters the drive path of the vertical blade assembly 102, with reduced turbulence, to further rotate the vertical blade assembly 102.

With reference to FIGS. 1-3, the fluid turbine device 100 is configured such that the vertical blade assembly 102 rotates counter-clockwise (FIG. 3). Alternatively, as shown in FIG. 5, a fluid turbine device 200 includes a vertical blade assembly 202 configured to rotate clockwise about a central axis 222. Further, a cowling is omitted from the fluid turbine device 200. In this manner, a fluid vortex may be formed within the fluid turbine device 200 and sufficiently exhausted from the fluid turbine device 200 such that guiding the fluid vortex by a cowling may not be necessary for a desired operation of the fluid turbine device.

According to another embodiment of the present disclosure, FIG. 6 illustrates a fluid turbine device 300 including a vertical blade assembly 302 having an end plate 318. The end plate 318 is disposed adjacent to multiple chambers 330. Each of the chambers 330 includes a fluid, such as anti-freeze, etc., sealed therein. Each of the chambers 330 are angled such that an end proximate to a central axis 322 of the vertical blade assembly 302 is lower than an end of the chamber distal from the central axis 322. In this manner, the fluid sealed within the chambers 330 rests substantially at the proximate end—close to the central axis 322—when the vertical blade assembly 302 is not rotating. Alternatively, when the vertical blade assembly 302 is rotating, the fluid sealed within the chambers 330 moves toward the perimeter of the end plate 318. In this manner, the vertical blade assembly 302 gains inertia to resist changes in rotation due to minor and/or transient changes in fluid flow relative to the fluid turbine device 300. On the contrary, when the fluid rests at the proximate end of the chambers 330 (the central axis 322 of vertical blade assembly 302), the vertical blade assembly 302 is more susceptible to changes in rotating, thereby providing easier initial rotation of the vertical blade assembly 302 from stop.

It should be appreciated that a different type of mass may be included at one or more locations in a fluid turbine device to affect the inertia of the vertical blade assembly when rotating. Further, the masses may be distributed differently—evenly or otherwise—to affect the inertia of a vertical blade assembly. In at least one embodiment, one or more chambers may comprise an end plate of a vertical blade assembly. Additionally, or alternatively, one or more chambers may be included at one or more different locations along a central axis of a vertical blade assembly, or elsewhere in a fluid turbine device, in some embodiments. In one example, chambers may be disposed at a top and/or a middle of a vertical blade assembly.

Referring again to FIGS. 4A-D, the fluid turbine device 100 includes multiple generators 132 enclosed by a generator enclosure 154 and mechanically coupled to the vertical blade assembly 102. The multiple generators 132 are provided to generate power when the vertical blade assembly 102 is rotated. While the fluid turbine device 100 includes four generators 132, a different number of generators may be included in different fluid turbine device embodiments. Generators may include any device suitable to convert mechanical energy into electrical energy.

In this particular embodiment, the generators 132 are alternators, which may need an electric field applied thereto—energized—prior to generating power. In this manner, each of the generators 132 may be selectively operated. In the particular embodiment shown, the generators 132 are selectively operated based on a rotational speed of the vertical blade assembly 102. As the speed of the vertical blade assembly 102 increases, the number of generators 132 energized also increases. In this manner, one or more of the multiple generators 132 may be operated close to peak output conditions, while the generators that are un-energized are not contributing to power generation or substantially inhibiting rotation of the vertical blade assembly—efficiency of the energize generators. Further, in various embodiments, rotational speeds coupled to each of multiple generators may be adjusted from one generator to another generator (e.g., via a planetary gear assembly, clutching device, electronic load device, etc.) to match an appropriate rotational speed with one or more characteristics of a particular generator. An exemplary planetary gear assembly 156 is shown in FIGS. 4A-D. In this particular embodiment, the generators 132 are permanent magnet alternators. In other embodiments, the generators may be other types of alternators, motors, etc., such as an inductance motor.

Additionally, or alternatively, in some applications, multiple generators may permit a fluid turbine device to generate at least some power, even if one of the multiple generators is not functional, e.g., damaged, etc. Accordingly, a fluid turbine device having less than all of the generators damaged may thus be partially functional even while waiting for the damaged generators to be repaired.

As shown in FIG. 7, a fluid turbine device 400 according to another embodiment of the present disclosure includes a shroud 406 and a steering assembly 434 coupled to the shroud 406. The steering assembly 434 is configured to orient the leading edge portion 408 of the shroud 406 in-line with a direction of fluid flow. The steering assembly 434 includes a rudder connected to the shroud 406. In the particular embodiment of FIG. 7, the steering assembly 434 is sufficiently compact to fit within the footprint of the vertical blade assembly 402 and shroud 406. In other embodiments, different shapes, sizes, and configurations of rudders, for example, beyond a footprint of a vertical blade assembly and/or shroud, may be employed to orient a shroud relative to a direction of fluid flow.

In the embodiment of FIGS. 8A-B, a fluid turbine assembly 500 includes a steering assembly. The steering assembly includes a fluid flow detector 536 and a motor 538 operably coupled to the fluid flow detector 536. As shown in FIG. 8A, the fluid flow detector 536 is disposed at the leading edge portion of the shroud 506. As shown in FIG. 8B, the motor 538 is disposed adjacent to a frame member 542 of the shroud 506 to orient the shroud 506 in-line with a direction of fluid flow, as detected by the fluid flow detector 536. In this particular embodiment, the motor 538 includes a servo motor. Other suitable types of motors, such as stepper motors, etc., and fluid flow detectors may be employed in other embodiments in one or more different positions on or near a shroud or fluid turbine device to orient the shroud in a direction of fluid flow. In some embodiments, a steering mechanism may be configured to orient a leading edge portion of a shroud relative to the direction of the fluid flow to be offset from the direction of fluid flow to compensate for an over-speed condition, such as inclement weather, etc. Orienting of the shroud in this manner may restrict the rotational speed of a vertical blade assembly to an acceptable operating range such that the fluid turbine device is able to operate during the over-speed condition and continue to generate power, rather than shutting down.

According to another exemplary embodiment of the present disclosure, a shroud 606 for a fluid turbine device is shown in FIG. 9. The shroud 606 includes an apertured surface 640 and a leading edge portion 608. The shroud's leading edge portion 608 has a surface 616 for deflecting fluid from a return path of multiple blades of a vertical blade assembly and a surface 617 for deflecting fluid flow into a drive path of the multiple blades. The surfaces 616, 617 are angled relative to one another (e.g., at an angle of about 60 degrees, etc.). The shroud 606 also includes a shroud skirt 626 and a frame member 642 for supporting the shroud skirt 626 and/or receiving a central axis of a vertical blade assembly. In the particular embodiment, the frame member 642 includes spoke segments 644 having reduced surface area in the direction of an axis to be received by the frame member 642 to limit interference with fluid flow relative to a vertical blade assembly.

As shown, the apertured surface 640 includes multiple staggered rows of openings 612. In other embodiments, such as shown in FIG. 2, a shroud may include elongate openings. It should be appreciated that a different pattern (e.g., stagger or un-staggered, etc.) size, shape, and/or number of openings may be included in different shroud embodiments. In at least some embodiments, a pattern of openings defined by an apertured surface may be dependent on a desired fluid flow between the two sides of the apertured surface or an expected pressure differential generator on the two sides of the apertured surface. Additionally, or alternatively, other factors, such as environmental characteristics, etc., may be considered.

One or more fluid turbine devices as disclosed herein may be included in an electrical system in some embodiments. In one example embodiment, shown in FIG. 10, an electrical system may include a grid 746 and multiple fluid turbine devices 700 electrically coupled to the grid 746. The multiple fluid turbine devices 700 provide power to the grid 746, which may be electrically connected to power one or more electrical devices. The grid 746 may be a grid private to the multiple turbine devices 700 or a public utility grid. In at least one embodiment, multiple fluid turbine devices are coupled to a private grid that is coupled to a public utility grid at a junction. A gateway device disposed at the junction opens/closes electrical continuity based on potential power generated by the fluid turbine devices. In another embodiment, as shown in FIG. 11, an electrical system may include an energy storage device (e.g., one or more batteries, capacitors, etc.) 848 and a fluid turbine device 800 electrically coupled to the battery 848. The battery 848 may be employed to store un-used power generated by the fluid turbine device 800. In still other embodiments, an electrical system may be a different combination of grids (public or private), storage devices, and fluid turbine devices.

According to another embodiment, a wind turbine device is illustrated in FIG. 12. The wind turbine device 900 is coupled to a support structure 952 of a billboard assembly 950. The billboard assembly 950 may include lights and/or one or more displays (not shown), which may be powered by the wind turbine device 900. The billboard assembly 950 may be coupled to a grid so that power generated by the wind turbine device 900 (but not used by the lights and/or displays) may be supplied to other electrical devices and/or batteries coupled to the grid. The billboard assembly 950 may or may not include one or more batteries. It should be appreciated that a wind turbine device may be coupled to one or more other components of a billboard assembly, as long as the wind turbine device 900 is exposed (at least part of the time) to fluid flow. FIG. 12 illustrates but one example environment in which aspects of the present disclosure may be used. Alternative uses and environments are also possible for an embodiment of a fluid turbine device disclosed herein, including uses and environments in which the blades are caused to rotate by either a flow of gas (e.g., air, etc.) or liquid (e.g., water, etc.).

According to another embodiment of the present disclosure, a method related to the operation of a fluid turbine device having a vertical blade assembly is disclosed. The method includes deflecting a portion of a fluid flow from a return path of the vertical blade assembly, while permitting another portion of the fluid flow to enter a drive path of the vertical blade assembly.

The fluid turbine device may include a shroud disposed at least partially about the vertical blade assembly to deflect the portion of the fluid flow from the return path. The method may further include orientating the shroud relative to a direction of the fluid flow to adjust the portions of fluid flow deflected from the return path and permitted into the drive path. The shroud may be oriented based on a rotational speed of the vertical blade assembly, a temperature of one or more generators mechanically coupled to the vertical blade assembly, etc.

FIG. 13 illustrates a fluid turbine device 1000 according to another example embodiment. The fluid turbine device 1000 includes a vertical blade assembly 1002 and a shroud 1004 rotatably coupled to the vertical blade assembly 1002. The vertical blade assembly 1002 includes six blades 1006A-F. This illustration also shows efficient exhaust paths including a vortex 1008. In this particular embodiment, the vertical blade assembly 1002 is permitted to rotate at a threshold rotational speed sufficient to form the vortex 1008. The rotational speed of the vertical blade assembly 1002 is additionally restricted above the threshold rotational speed, so that the fluid flow against the blades 1006 generates increased force (as compared to an unrestricted rotational speed). Restricting the rotation speed (above the threshold rotation speed) further reduces introduction of turbulence into the fluid flow, which is better for subsequent or downstream fluid turbine devices. For example, a threshold rotational speed to generate a vortex may include about 50 rpms, and the vertical blade assembly 1002 may be restricted to a range of about 60-200 rpms to ensure formation of the vortex 1008, but restrict the rotational velocity and reduce turbulence.

FIG. 14 is a plan view of an exemplary embodiment of a fluid turbine device 1100 and illustrating generator gearing for rotational speed control. As shown in FIG. 14, the fluid turbine device 1100 includes a vertical blade assembly 1102 and four generator gears 1104A-D (coupled to generators 1106A-D) disposed about another gear 1108 coupled to the vertical blade assembly 1102. In this example, a gearing ratio of 50:1 is illustrated. Alternative embodiments may include different configurations such as configurations that include more or less gears. Also, a wide range of gearing ratios may be used in other embodiments. For example, gearing ratios ranging from 2:1 to 200:1, or any of the discrete ratios therebetween, may be used in other exemplary embodiments. In another example embodiment, a gearing ratio of 4:1 is used. In a further example embodiment, a gear ratio of 25:1 is used. In an additional example embodiment a gearing ratio of 100:1 is used.

Figure 17A:

FIG. 15 illustrates a fluid turbine device 1200 according to another example embodiment of the present disclosure. The fluid turbine device includes a vertical blade assembly 1202 and a shroud 1204. As shown the shroud includes a leading edge 1206, which is offset from the direction of the fluid flow 1208, or in this example, wind. The fluid turbine device 1200 includes a motor 1209 coupled to the shroud 1204 to orient the shroud 1204 relative to the direction of the fluid flow 1208. In this particular embodiment, the motor 1209 (e.g., a stepper motor, etc.) orients the leading edge 1206 of the shroud 1204 into the direction of the fluid flow 1208, as shown in FIG. 16. As should be apparent, the shroud may be oriented relative to the direction of the fluid flow by other devices, mechanically and/or electrically. For example, as explained with respect to FIG. 7, a rudder 434 may be employed. FIG. 17 illustrates that the shroud 1204 may be oriented relative to the direction of the fluid flow, via the motor 1209 and control 1210, in either the counter-clockwise direction (FIG. 17A) or the clockwise direction (FIG. 17B).

The shroud may be oriented relative to the direction of fluid flow for various reasons, including a rotational speed of the vertical blade assembly, a temperature of one or more generators mechanically coupled to the vertical blade assembly, etc. In this example, the leading edge 1206 was oriented to increase the portion of the fluid flow into the drive path of the vertical blade assembly 1202. In other embodiments, the shroud may be oriented to reduce the portion of fluid flow entering the drive path. For example, the shroud may be oriented to reduce the portion of fluid flow entering the drive path to control the rotational speed of the vertical blade assembly relative to a predetermined rotational speed. Additionally or alternatively, the shroud may be oriented relative to the direction of the fluid flow to control the rotational speed when all generators coupled to the vertical blade assembly are activate, or when less than all generators are active.

Referring to FIG. 15, the fluid turbine device 1200 includes a control 1210 and a sensing device 1212. The control 1210 is operably coupled to the sensing device 1212 and configured to activate the generators based on the sensed operating characteristic of the fluid turbine device 1200. In this particular embodiment, as explained above, the operating characteristic is a rotational speed of the vertical blade assembly and the sensing device 1212 is a speed sensor positioned to determine the rotational speed of the vertical blade assembly 1202. The control 1210 is configured to activate said generator when the sensed rotational speed of the vertical blade assembly 1202 exceeds a predetermined speed, such as 50 rpms, etc.

As should be apparent other operating characteristics may be sensed, and the sensing device may be of a different type, to activate one or more generators included in another fluid turbine device embodiment. Other operating characteristics may include, for example, the temperature of one or more generators, the temperature of one or more bearings, the temperature of one or more gears or gear boxes, etc.

Further, in the embodiment of FIG. 15, each of the four generators includes a shaft (not shown) coupled to gears 1214A-D. Each of the gears is mechanically coupled to a gear 1216 coupled to and rotatable with the vertical blade assembly 1202. The gears 1214A-D are configured such that one rotation of the vertical blade assembly 1202 causes multiple rotations of the shaft. Specifically, in this embodiment, for each rotation of the vertical blade assembly 1202, each shaft of each generator rotates 50 times. As should be apparent, a different gear having different configurations, as well as a different number of generators, may be included in other embodiments. For example, the gearing ratio may include the ranges disclosed above.

In another example, when all of the generators included in a fluid turbine device are active, a control may receive an input from a sensor indicating the temperature of one or more generators included in the FTD. In this example, the control may be configured to orient a leading edge of the shroud in a direction offset from the direction of the fluid flow to adjust the portions of the fluid flow when each of the multiple generators is activated and the temperature of one or more of the generators exceeds a pre-determined value. Additionally or alternatively, the control 1210 may be configured to orient the leading edge 1206 of the shroud 1204 in a direction offset from the direction of the fluid flow to adjust the portions of the fluid flow when each of the multiple generators is activated and the rotational speed exceeds the predetermined speed, such as 200 rpms or another rotational velocity above 200 rpms, etc. It should be appreciated that the shroud of the fluid turbine device may be orientated based on one or more operating characteristics of the fluid turbine device to protect the fluid turbine device from damage, such as overheating, exceeding component maximums, etc., and to regulate generation of power, preferable to an optimal or substantially optimal performance.

Further, the generators included in the fluid turbine device 1200 are evenly distributed above a central axis of the fluid turbine device 1200. Other configurations, balances and unbalanced, may be employed in other fluid turbine device embodiments. For example, a fluid turbine device may include one, two, five, six, seven, or more generators, etc.

When a fluid turbine device includes multiple generators, the generators may be activated to regulate the rotational speed of the vertical blade assembly. In the example embodiment of FIG. 15, the control 1210 is configured to activate one of the multiple generators whenever the sensed rotational speed exceeds a predetermined speed, until each of the multiple generators are activated. Generators may be activated by mechanically coupling the generator to a vertical blade assembly, or in this particular embodiment, by energizing the generator, etc. Further, in this example, the control 1210 is configured to orient the leading edge 1206 of the shroud 1204 in a direction offset from the direction of the fluid flow 1208 to adjust the portions of the fluid flow when each of the multiple generators is activated and the rotational speed exceeds the predetermined speed.

In some example embodiments, two or more fluid turbine devices may be collectively coupled on one or more platforms, structures, or other mounting apparatus. Additionally, these fluid turbine devices can operate simultaneously on a platform, structure, or other mounting apparatus. The platforms, structures, and mounting apparatus can be stacked such that each platform, structure, or mounting apparatus are fixed or coupled to each other. Many variations of stacking, coupling, ganging, number of fluid turbine devices, and combinations thereof may be utilized. Additionally, the platforms, structures, or mounting apparatus can be comprised of many shapes, sizes, and dimensions. And, such platforms, structures, or mounting apparatus can be combined to comprise multiple platforms, structures or mounting apparatus. Exemplary fluid turbine devices disclosed herein are designed to be modular enough for installation in a variety of existing structures from commercial to residential, while addressing the noise syndrome issues associated with large commercial wind turbines.

FIG. 18 illustrates an exemplary embodiment of a wind farm 1300 that includes two fluid turbine devices 1302 coupled and/or ganged together, for operating collectively and/or simultaneously on a platform, structure, or other mounting apparatus 1304. The fluid turbine devices 1302 are arranged linearly and side-by-side in this example, which allows both fluid turbine devices 1302 to be located in the fluid flow, such as a wind path.

FIG. 19 illustrates an exemplary embodiment of a wind farm 1400 that includes four fluid turbine devices 1402 coupled and/or ganged together, for operating collectively and/or simultaneously on a platform, structure, or other mounting apparatus 1404. The four fluid turbine devices 1402 are linearly arranged and side-by-side in this example. This example allows all four fluid turbine devices 1402 to be located in the wind path.

FIG. 20 illustrates an exemplary embodiment of a wind farm 1500 that includes seven fluid turbine devices 1502 coupled and/or ganged together, for operating collectively and/or simultaneously on a platform, structure, or other mounting apparatus 1504. In this example, three fluid turbine devices 1502 are disposed above the four lower fluid turbine devices 1502. While this example only illustrates two layers of platforms, structures, or other mounting apparatus fixed or coupled to each other, other embodiments may include any number of layers, different arrangements, shapes, sizes, dimensions, etc. of the platforms, structures, or other mounting apparatus. There can be many variations of stacking, coupling, number of fluid turbine devices and combinations of the aforementioned. For example, FIG. 21 illustrates additional exemplary embodiment of a wind farm 1600 that includes fluid turbine devices 1602 in an example stacked arrangement, supported by a structure 1604. FIG. 22 illustrates another exemplary embodiment of a wind farm 1700 that includes fluid turbine devices 1702 in an example stacked arrangement, supported by a structure 1704. In other examples, fluid turbine devices may form an irregular pattern, omitting fluid turbine that may have reduced wind flow thereto. For example, a tree, building, or other wind interruption, etc. may provide reasons to omit a fluid turbine device for a pattern of rows, stacks, and columns, etc.

FIG. 23 illustrates an exemplary embodiment of a wind farm 1800 that includes eight fluid turbine devices 1802 coupled and/or ganged together, for operating collectively and/or simultaneously on a platform, structure, or other mounting apparatus 1804. In this example, seven fluid turbine devices 1802 are disposed about a middle or center fluid turbine device 1802 and arranged in a heptagonal configuration. A wide range of other configurations are also possible for this ganging or coupling aspect of the fluid turbine devices 1802 including triangular, octagonal, circular, rectangular, or other geometric patterns, etc. For example, FIG. 24 illustrates another exemplary embodiment of a wind farm 1900 that includes four fluid turbine devices 1902 coupled and/or ganged together, for operating collectively and/or simultaneously on a platform, structure, or other mounting apparatus 1904. In this example, three fluid turbine devices 1902 are disposed about a middle or center fluid turbine device 1902 and arranged in a triangular configuration. Yet another exemplary embodiment of a wind farm 2000 is illustrated in FIG. 25, which includes 12 fluid turbine devices 2002 coupled and/or ganged together, for operating collectively and/or simultaneously on a platform, structure, or other mounting apparatus 2004. In this example, the fluid turbine devices 2002 are arranged in a rectangular array that includes 3 rows and four columns.

In some exemplary embodiments, there may be multiple platforms, structures, or mounting apparatus that are coupled together for supporting one or more fluid turbine devices. For example, multiple pillars may be coupled together.

FIG. 26 illustrates an exemplary embodiment of a wind farm 2100 in which a plurality of fluid turbine devices 2102 are supported by a framework or structure 2104. The structure 2104 includes pillars or vertical support members 2106 have an airfoil configured (e.g., designed, attached, located, etc.) to direct laminar flow through the structure 2104 thus reducing turbulence. By way of example, FIG. 27 illustrates an example of a vertical support member 2106 having an airfoil that may be used in the structure 2104 shown in FIG. 26.

Yet another exemplary embodiment of a wind farm 2200 is illustrated in FIG. 28, which includes seven fluid turbine devices 2202 coupled and/or ganged together, for operating collectively and/or simultaneously on a platform, structure, or other mounting apparatus 2204, having vertical support members 2206. In this example, the fluid turbine devices 2202 are arranged in a hexagon array with one fluid turbine device 2202 in the middle.

FIGS. 29A-B illustrates a fluid turbine device 2300 according to another example embodiment of the present disclosure. The fluid turbine device 2300 includes a vertical blade assembly 2302 and a shroud 2304 disposed at least partially about the vertical blade assembly 2302. The shroud 2304 includes a shroud skirt 2306 at the top and a shroud skirt 2308 at the bottom. The shroud skirts 2306, 2308 are disposed to inhibit the ingress of debris (e.g., dust, etc.) into the vertical blade assembly 2302 and/or the fluid turbine device 2300. In this particular embodiment, the shroud skirt 2306 extends downward (e.g., less than 1 inch, 1 inch, 2 inches, 3 inches or more, etc.) to cover a top portion of the vertical blade assembly 2302, and the shroud skirt 2308 extends upward (e.g., less than 1 inch, 1 inch, 2 inches, 3 inches or more, etc.) to cover a bottom portion of the vertical blade assembly 2302. Alternatively, the shroud skirts may extend substantially level with the end plates of the vertical blade assembly 2302 to permit fluid access to substantially the entire surface of the blades 23 of the vertical blade assembly 2302. As shown, the shroud 2304 includes an end plate 2310 coupled to the shroud skirt 2306, which extends even with the end plate 2310.

As shown in FIGS. 28A-B, the shroud skirt 2306 includes a leading end portion 2312 and a blade assembly portion 2314. The blade assembly portion 2314 is positioned circumferentially about at least a portion of the vertical blade assembly 2302. The leading edge portion 2312 tangentially couples to the blade assembly portion 2314. It should be appreciated that in other embodiments, one or more shroud skirts may be omitted or include a different configuration (shape, size, orientation, position, etc.).

Additional aspects of the present disclosure provide methods relating to the operation of a fluid turbine device. One such method includes deflecting a first portion of a fluid flow from a return path of a vertical blade assembly, while permitting a second portion of the fluid flow to enter a drive path of the vertical blade assembly. In one example embodiment, the fluid turbine device includes a shroud disposed at least partially about the vertical blade assembly to deflect the first portion of the fluid flow. Another example method includes operating the fluid turbine device by slowing its vertical blade assembly to increase applied pressure to increase pressure to the drive path where the fluid turbine device's laminar flow is achieved thereby reducing the propensity for turbulence.

A further example method includes tuning or orienting the shroud to achieve laminar flow. Specifically, the shroud may be tuned or oriented relative to a direction of fluid flow to adjust the portion of air deflected from the return path and the portion of fluid flow permitted to enter the drive path. The shroud may be oriented based on one or more of a rotational speed of the vertical blade assembly, a temperature of one or more generators mechanically coupled to the vertical blade assembly, etc. Yet another method may include regulating the rotational speed of the vertical blade assembly. The rotational speed may be regulated by orienting the shroud, activating one or more generators, mechanically restricting rotation of the vertical blade assembly, etc. In one example method, regulating the rotational speed includes activating at least one of multiple generators mechanically coupled to the vertical blade assembly. Further, in the example method, activating one of the multiple generators may include activating one of the multiple generators when the rotational speed of the vertical blade assembly exceeds a predetermined speed, until each of the multiple generators is activated. Alternatively, or additionally, the example method may also include deactivating at least one of the multiple generators when the rotational speed of the vertical blade assembly falls below a predetermined speed.

Another example embodiment includes a method related to a fluid turbine device. The fluid turbine device includes a shroud and a vertical blade assembly defining a central axis and having multiple blades disposed about the central axis. The shroud is disposed at least partially about the vertical blade assembly. The vertical blade assembly is rotatable about the central axis in response to a fluid flow and mechanically coupled to a generator. The example method includes orienting the shroud relative to the fluid flow to deflect a first portion of the fluid flow from a return path of the vertical blade assembly and to permit a second portion of the fluid flow to enter a drive path of the vertical blade assembly and activating the generator, based on an operating characteristic of the fluid turbine device, to regulate the rotational speed of the vertical blade assembly.

Additionally, orienting the shroud includes orienting the shroud in the direction of the fluid flow. Further, the operating characteristic is rotational speed of the vertical blade assembly in some example embodiments. Additionally, or alternatively, the example method may include activating the one of multiple generators whenever the rotational speed exceeds a predetermined speed, until each of the multiple generators is activated. Additionally, orienting the shroud may include, for example, orienting the shroud in a direction offset from the direction of the fluid flow to adjust the portions of the fluid flow when each of the multiple generators is activated and the rotational speed exceeds the predetermined speed. In some example methods, activating a generator includes applying power to said generator. Additionally, or alternatively, activating a generator may include mechanically coupling the generator to the vertical blade assembly, whereby rotation of the vertical blade assembly causes rotation of a shaft extending from the generator.

Yet another method includes the technique of leveraging multiple devices on a shared platform, structure, or other mounting apparatus where said shared space can be stacked. Additionally, there can be a plurality of platforms, structures, or other mounting apparatus.

A method may also include generating a pressure differential for exhausting fluid from the return path and through a shroud assembly coupled to the vertical blade assembly. Specifically, in one example, the fluid may be exhausted through one or more apertures in the shroud. Additionally, or alternatively, a method may include forming a fluid vortex within the fluid turbine device and exhausting the fluid vortex through an end plate of the vertical blade assembly. In some embodiments, permitting a portion of the fluid flow to enter a drive path of the vertical blade assembly may include deflecting fluid flow into the drive path of the vertical blade assembly.

A method may include selectively activating a plurality of generators based on a rotational speed of the vertical blade assembly. Additionally, or alternatively, a method may include redistributing mass from an interior position relative to the vertical blade assembly toward a perimeter position of the vertical blade assembly to limit the affect of fluid flow fluctuations.

In another exemplary method relating to the operation of a fluid turbine device, the velocity or rotational speed of the turbine is slowed to increase the pressure applied to the drive path where the device's velocity is equal to or greater than the point where laminar flow is achieved, thus reducing the propensity for turbulence. The reduced velocity is realized by manipulation of load demands applied to the electrical generation system.

In a further exemplary method relating to the operation of a fluid turbine device, the velocity or rotational speed of the fluid turbine device is manipulated to either increase, decrease or keep the pressure applied to the drive path at optimal efficiency (or at least a good or improved efficiency) by tuning or orienting the shroud in a bidirectional manner when maximum capacity is reached; by tuning or orienting the shroud to more directly direct fluid to the drive path when peak capacity is not reached; and by keeping the shroud in the optimal position when at peak capacity.

In one or more exemplary methods, the fluid turbine device may be operating such that the velocity or rotational speed of the fluid turbine device is slowed to increase the pressure applied to the drive path. By way of background, when a stationary object is impacted by force, it has a certain resistance. When the same stationary object moves into the force, greater pressure is achieved. But moving with the force reduces pressure. Thus, a maximum energy exchange may be achieved when at a standstill or moving into the force.

The fluid turbine device's velocity or rotational speed may be equal to or greater than the point where laminar flow is achieved, thus reducing the propensity for turbulence. The velocity or rotational speed of the fluid turbine device may be realized by manipulation of load demands applied to the electrical generation system. A wide range of gearing ratios may be used to transfer loads from the fluid turbine device to an electric generation system. By way of example, gearing ratios ranging from 1:1 to 50:1 (or more) may be used in exemplary embodiments of the present disclosure. In an example embodiment, a gearing ratio of 4:1 is used. In another example embodiment, a gear ratio of 25:1 is used. In still a further example embodiment a gearing ratio of 100:1 is used. It should be appreciated that in various embodiments, a sufficiently high gear ratio is provided to reduce the velocity or rotational speed of the vertical blade assembly, in order to increase the pressure applied to each blade. As should be apparent in such embodiments, any gear ratio may be selected, which is sufficient to reduce velocity or rotational speed of the vertical blade assembly, thereby providing increased pressure and thus increase the harvest potential form the fluid turbine device.

The shroud may be oriented or tuned when the electrical demand loads have been completely exhausted and/or when at maximum output, in order to avoid or mitigate damage. For example, the shroud is tuned or oriented when the fluid turbine device has achieved capacity by blocking incoming forces so that the fluid turbine device is able to continue load generation at peak capacity. The tuning or orienting of the shroud may occur when fluid turbine device is not achieving peak capacity so that the shroud further directs more force into the drive path. The tuning or orienting of the shroud can occur in a bidirectional manner.

In some applications practicing one or more of the methods disclosed herein, a fluid turbine device may provide efficient fluid flow path through and/or about the fluid turbine device, thereby reducing fluid flow turbulence of a vertical blade assembly and providing an efficient fluid turbine device. Additionally or alternatively, in some applications, a fluid turbine device according to the present disclosure may provide reduced loads on the fluid turbine device, and as a result less load on a structure supporting the fluid turbine device. In this manner, fluid turbine devices according to the present disclosure may be coupled to structures understood by those skilled in the art to be insufficient to harness fluid flow potential.

Various exemplary embodiments may include one or more vertical axis wind turbines configured with one or more of the following features, such as a configuration that allows the force of the wind to impact the turbine blade in a perpendicular manner. A shroud is provided for protecting the return side of the turbine. The shroud creates an "airfoil" effect and area of reduced air pressure. This lower pressure area reduces turbulence and air compression within the shroud. The shroud is independent to the turbine blade assembly. Control of the shroud may occur via a rudder or electro-mechanical means supported by a wind direction sensor. These components determine and influence rotation and inherent spin direction of the vortex generated within the turbine. Open circular ports may be located on the lower end plate of the turbine, which will increase laminar flow creating a vortex or "tornado" effect. The additional wind velocity in the center of the turbine will increase the efficiency of the unit. An angular leading edge nose will slightly compress the air at the initial point of contact thus compounding the forces applied. A rudder steering mechanism will constrain the deflector shroud to face into the wind directly. To attain maximum or improved efficiency at various levels of wind forces, an array of small generators may be positioned with a planetary gearing arrangement. Monitored by a tachometer and excited individually, the turbine may be operable to make full use of all wind speeds. The planetary gear configuration will increase the ratio of the generator revolutions per minute to that of the turbine. An undercarriage support structure may be provided with tubes orientated slightly upwards from the center out. Fluid, internal to these tubes will be centrifugally forced outwards during rotation thus increasing the potential and minimizing or reducing the impact of generators turning on sequentially. The concept of multiple small generating units may allow for reductions in cost of fabrication and increase the overall efficiency in all or various wind levels. Repair and maintenance may be conducted without the assistance of large cranes. The modular design may help ensure peak operating efficiencies by reducing the potential of full system down time. Isolation of an individual turbine for repair or maintenance, while other generators on the tower continue to operate, will keep the system at maximum potential.

Various exemplary embodiments may provide a vertical axis wind turbine that has a compact design, which permits installation in previously inaccessible wind corridors and/or installation on tall buildings in metropolitan areas, billboards in suburban settings and water towers in rural settings. An exemplary embodiment of a vertical axis wind turbine disclosed herein may provide one or more of the following advantages: modular design, varying size configurations, and/or reduced and/or easier maintenance.

In various exemplary embodiments, a wind farm is comprised of a plurality of turbine devices disclosed herein, wind farm may be installed on top of large buildings in urban settings in addition to a multitude of other configurations in urban, suburban and rural settings. In this wind farm, the turbine devices may be connected to maximize or increase the energy harvest potential while providing advantages such as scalability, low wind speed operation, reduced maintenance, nearly silent operation, small foot print, fits in most freight elevators, and/or suitable for LEED building initiative.

In various exemplary embodiments, a large wind farm is comprised of a plurality of turbine devices disclosed herein, wind farm may be installed in large wind farm settings in rural and urban environments alike. The scope of installation is dependent on various factors, but generally may be scaled according to the size of available space for installation. In various wind farm embodiments, maintenance and repair can be performed on a single turbine device without having to take or shut down the entire wind farm. Other advantages may include operating efficiently in high wind speeds, generation starts in low wind speeds, reduced maintenance required, lower maintenance cost, and/or nearly silent operation.

Example embodiments are provided so that this disclosure will be thorough, and will fully convey the scope to those who are skilled in the art. Numerous specific details are set forth such as examples of specific systems, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, surfaces, portions and/or sections, these elements, components, regions, surfaces, portions and/or sections should not be limited by these terms. These terms may be only used to distinguish one element, component, region, surface, portion or section from another region, surface, portion or section. Terms such as "first," "second," and other numerical terms when used herein do not imply a sequence or order unless clearly indicated by the context. Thus, a first element, component, region, surface, portion or section discussed below could be termed a second element, component, region, surface, portion or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter. The disclosure of a first value and a second value for a given parameter can be interpreted as disclosing that any value between the first and second values could also be employed for the given parameter. Similarly, it is envisioned that disclosure of two or more ranges of values for a parameter (whether such ranges are nested, overlapping or distinct) subsume all possible combination of ranges for the value that might be claimed using endpoints of the disclosed ranges.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method related to the operation of a fluid turbine device having a vertical blade assembly and a shroud disposed at least partially about the vertical blade assembly to deflect the first portion of the fluid flow, the method comprising deflecting a first portion of a fluid flow from a return path of the vertical blade assembly, while permitting a second portion of the fluid flow to enter a drive path of the vertical blade assembly; and orienting the shroud relative to a direction of the fluid flow to adjust the first and second portions of fluid flow, wherein the shroud is oriented based on at least a rotational speed of the vertical blade assembly.

2. The method of claim 1, further comprising generating a pressure differential for exhausting fluid from the return path through one or more apertures in the shroud.

3. The method of claim 1, wherein the fluid turbine device is supported by a structure having at least one vertical member defining an airfoil.

4. The method of claim 1, further comprising regulating the rotational speed of the vertical blade assembly.

5. The method of claim 4, wherein regulating the rotational speed includes activating at least one of multiple generators mechanically coupled to the vertical blade assembly.

6. The method of claim 5, wherein activating said at least one of the multiple generators includes activating one of the multiple generators when the rotational speed of the vertical blade assembly exceeds a predetermined speed, until each of the multiple generators is activated.

7. The method of claim 5, further comprising deactivating at least one of the multiple generators when the rotational speed of the vertical blade assembly falls below a predetermined speed.

8. The method of claim 1, further comprising selectively activating a plurality of generators based on a rotational speed of the vertical blade assembly.

9. The method of claim 1, wherein the method includes:
   activating one of multiple generators whenever the rotational speed exceeds a predetermined speed, until each of the multiple generators is activated.

10. The method of claim 1, wherein orienting the shroud includes orienting the shroud in a direction offset from the direction of the fluid flow to adjust the first and second portions of the fluid flow when each of the multiple generators is activated and the rotational speed exceeds the predetermined speed.

11. A method related to the operation of a fluid turbine device having a vertical blade assembly and a shroud disposed at least partially about the vertical blade assembly to deflect the first portion of the fluid flow, the method comprising deflecting a first portion of a fluid flow from a return path of the vertical blade assembly, while permitting a second portion of the fluid flow to enter a drive path of the vertical blade assembly; and orienting the shroud relative to a direction of the fluid flow to adjust the first and second portions of fluid flow, wherein the shroud is oriented based on at least a temperature of one or more generators mechanically coupled to the vertical blade assembly.

12. A method related to the operation of a fluid turbine device having a vertical blade assembly, the method comprising:
   deflecting a first portion of a fluid flow from a return path of the vertical blade assembly, while permitting a second portion of the fluid flow to enter a drive path of the vertical blade assembly; and
   redistributing mass from an interior position relative to the vertical blade assembly toward a perimeter position of the vertical blade assembly to limit the affect of fluid flow fluctuations.

13. The method of claim 12, wherein the fluid turbine device includes a shroud disposed at least partially about the vertical blade assembly to deflect the first portion of the fluid flow.

14. The method of claim 13, further comprising orienting the shroud relative to a direction of the fluid flow to adjust the first and second portions of fluid flow.

15. The method of claim 14, wherein the shroud is oriented based on at least a rotational speed of the vertical blade assembly.

16. A method related to a fluid turbine device, the fluid turbine device including a shroud and a vertical blade assembly defining a central axis and having multiple blades disposed about the central axis, the shroud disposed at least partially about the vertical blade assembly, the vertical blade assembly rotatable about the central axis in response to a fluid flow and mechanically coupled to a generator, the method comprising:
   orienting the shroud relative to the fluid flow to deflect a first portion of the fluid flow from a return path of the vertical blade assembly and to permit a second portion of the fluid flow to enter a drive path of the vertical blade assembly; and
   activating the generator, based on an operating characteristic of the fluid turbine device, to regulate the rotational speed of the vertical blade assembly;
   wherein:
      the operating characteristic is rotational speed of the vertical blade assembly,
      activating the at least one generator includes activating one of multiple generators whenever the rotational speed exceeds a predetermined speed, until each of the multiple generators is activated; and
      orienting the shroud includes orienting the shroud in a direction offset from the direction of the fluid flow to adjust the first and second portions of the fluid flow when each of the multiple generators is activated and the rotational speed exceeds the predetermined speed.

17. The method of claim 16, wherein orienting the shroud includes orienting the shroud in the direction of the fluid flow.

18. The method of claim 16, wherein activating the generator includes applying power to said generator.

19. The method of claim 16, wherein activating said generator includes mechanically coupling the generator to the vertical blade assembly, whereby rotation of the vertical blade assembly causes rotation of a shaft extending from the generator.

* * * * *